United States Patent
Torres et al.

(10) Patent No.: US 11,205,458 B1
(45) Date of Patent: Dec. 21, 2021

(54) SYSTEM AND METHOD FOR THE COLLABORATIVE CREATION OF A FINAL, AUTOMATICALLY ASSEMBLED MOVIE

(71) Applicants: Alexander Torres, Miami, FL (US); Ian Michael Tepoot, Homestead, FL (US); Trevor Finney, Dublin, VA (US)

(72) Inventors: Alexander Torres, Miami, FL (US); Ian Michael Tepoot, Homestead, FL (US); Trevor Finney, Dublin, VA (US)

( * ) Notice: Subject to any disclaimer, the term of this patent is extended or adjusted under 35 U.S.C. 154(b) by 0 days.

(21) Appl. No.: 16/591,357

(22) Filed: Oct. 2, 2019

Related U.S. Application Data

(60) Provisional application No. 62/740,212, filed on Oct. 2, 2018.

(51) Int. Cl.
*G11B 27/036* (2006.01)
*H04N 5/222* (2006.01)
*G06F 16/74* (2019.01)

(52) U.S. Cl.
CPC .......... *G11B 27/036* (2013.01); *G06F 16/743* (2019.01); *H04N 5/2222* (2013.01)

(58) Field of Classification Search
CPC .... G11B 27/036; H04N 5/2222; G06F 16/743
USPC ...................................................... 386/280
See application file for complete search history.

(56) References Cited

U.S. PATENT DOCUMENTS

| | | | |
|---|---|---|---|
| 5,801,685 A | 9/1998 | Miller et al. | |
| 8,201,073 B2 | 6/2012 | Canora et al. | |
| 8,867,901 B2 | 10/2014 | Gebert et al. | |
| 8,888,494 B2 | 11/2014 | Threewits | |
| 9,251,359 B2 | 2/2016 | Leppänen et al. | |
| 2003/0060910 A1 | 3/2003 | Williams et al. | |
| 2006/0064644 A1 | 3/2006 | Joo | |
| 2006/0251382 A1 | 11/2006 | Vronay et al. | |
| 2007/0038938 A1 | 2/2007 | Canora et al. | |
| 2007/0162854 A1 | 7/2007 | Kikinis | |
| 2009/0009605 A1 | 1/2009 | Ortiz | |
| 2009/0271279 A1 | 10/2009 | Brandelli | |
| 2011/0161348 A1 | 6/2011 | Oron | |

(Continued)

FOREIGN PATENT DOCUMENTS

| | | |
|---|---|---|
| EP | 2775703 B1 | 7/2017 |
| WO | 2014089362 A1 | 6/2014 |
| WO | 2017120211 A1 | 7/2017 |

*Primary Examiner* — Loi H Tran
(74) *Attorney, Agent, or Firm* — Hanrahan Law Firm, P.A.; Benjamin M. Hanrahan

(57) ABSTRACT

A system and method for collaboratively creating an automatically assembled movie is presented herein. The system and method includes identifying a predefined movie script, wherein the predefined movie script defines or includes a plurality of character roles, and for each of the plurality of character roles, includes at least one clip request. Users of the system and method are invited to join a movie making group, and once joined, are assigned to one of the character roles. For each of the character roles, the system and method will receive a raw or pre-processed media clip recorded by the user's device and which corresponds with the clip request. The pre-processed media clips are then automatically processed by the system and method according to script rules by applying filters or visual effects. The processed media files are the automatically combined according to script rules to create the final movie.

16 Claims, 24 Drawing Sheets

(56) References Cited

U.S. PATENT DOCUMENTS

| | | |
|---|---|---|
| 2012/0263439 A1 | 10/2012 | Lassman et al. |
| 2012/0311448 A1* | 12/2012 | Achour .................. G11B 27/34 715/723 |
| 2013/0132835 A1* | 5/2013 | Goldenberg ............ G06T 13/20 715/716 |
| 2016/0125916 A1 | 5/2016 | McNally et al. |
| 2017/0076751 A9 | 3/2017 | Hamer |
| 2017/0230719 A1* | 8/2017 | Groman ............. H04N 21/2541 |

* cited by examiner

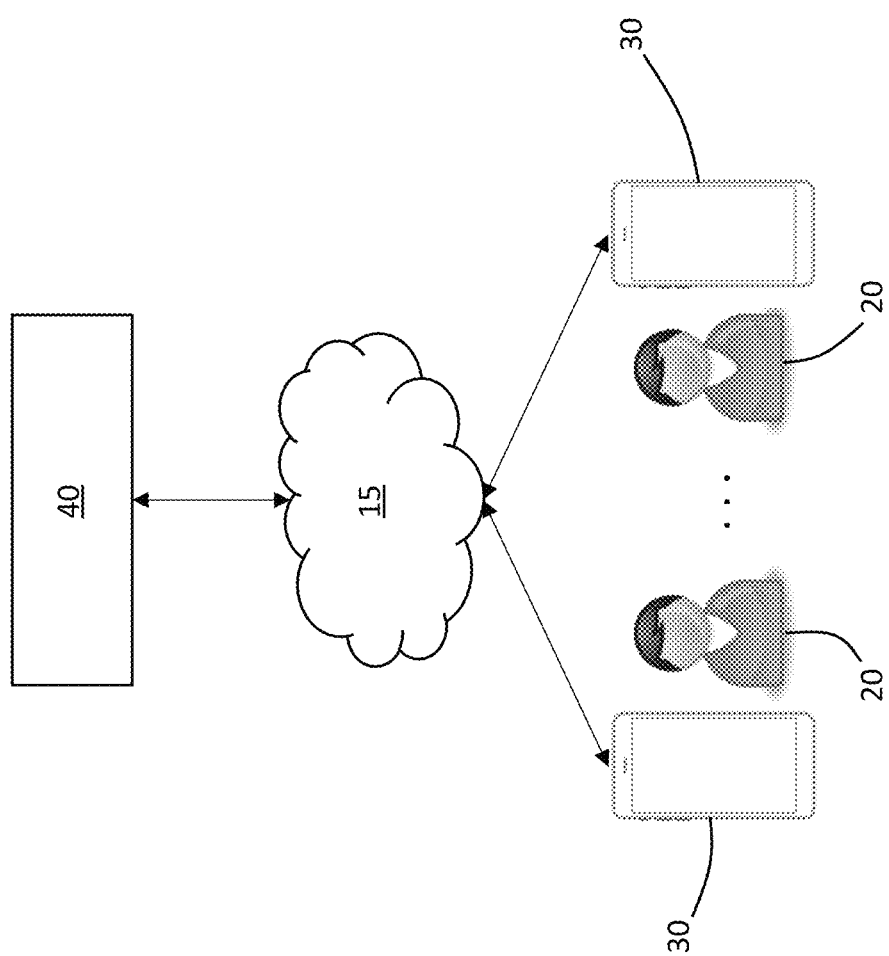

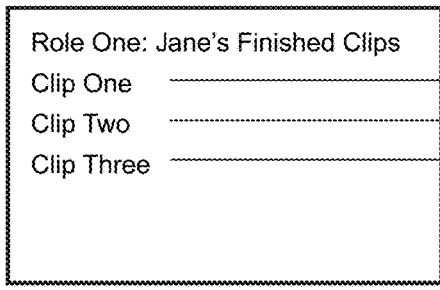
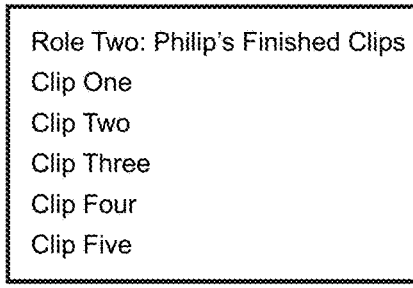
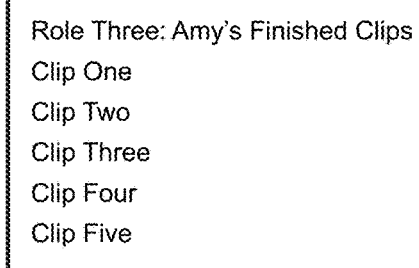
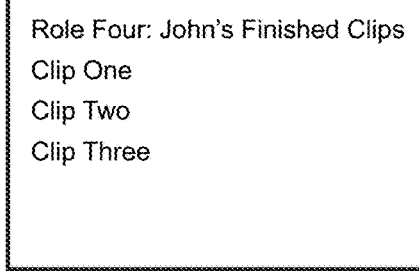
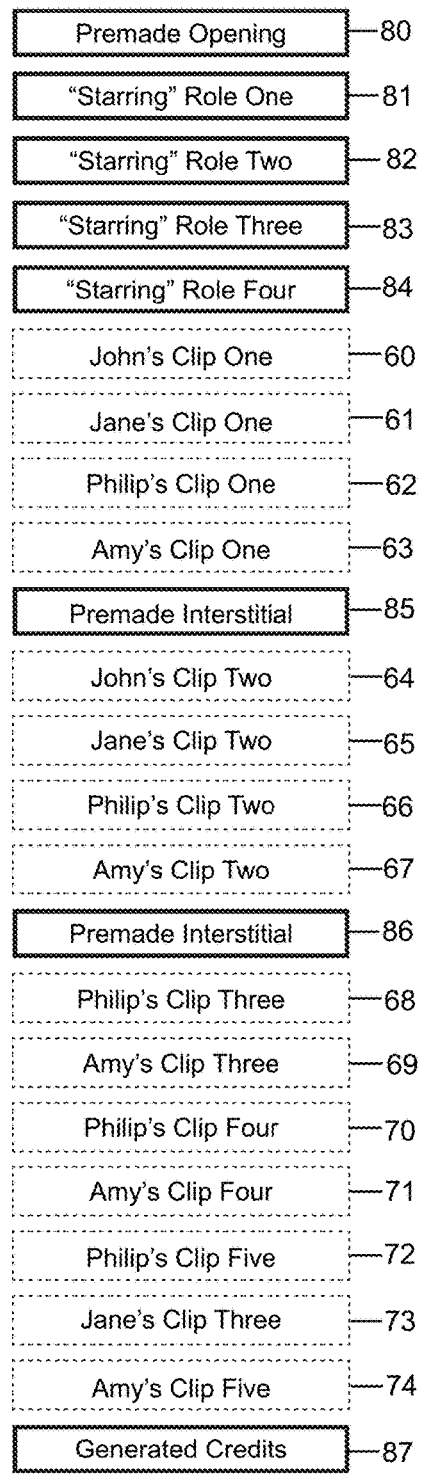
FIG. 6

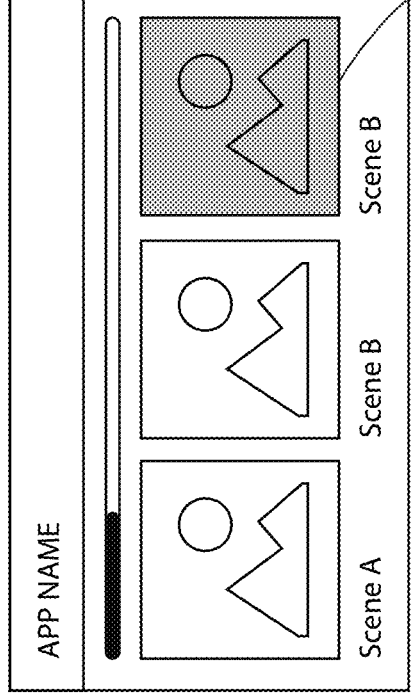
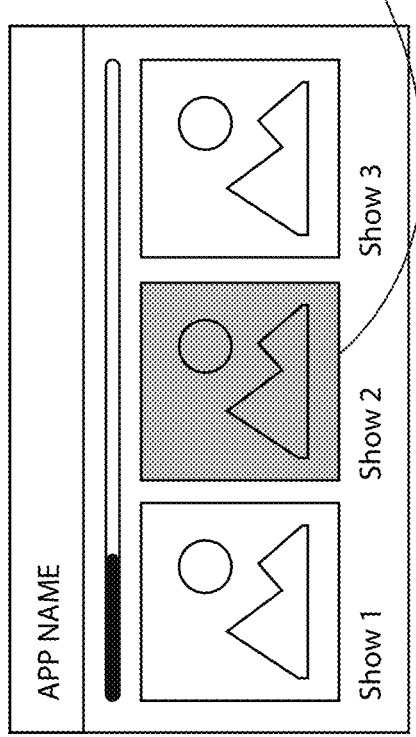
FIG 8A

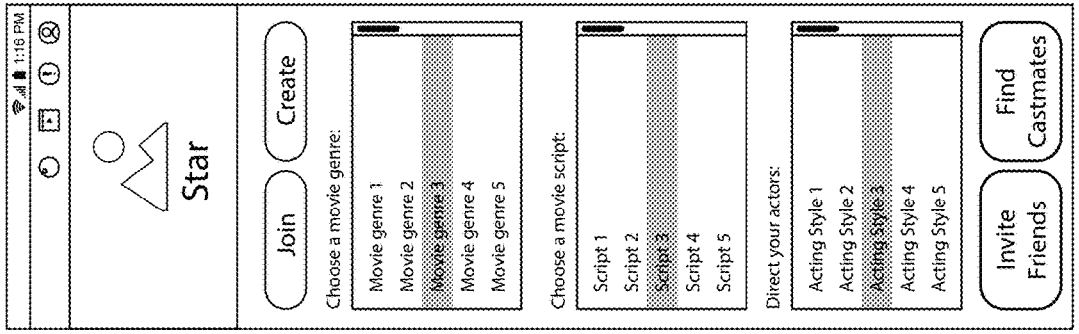
FIG. 9C4
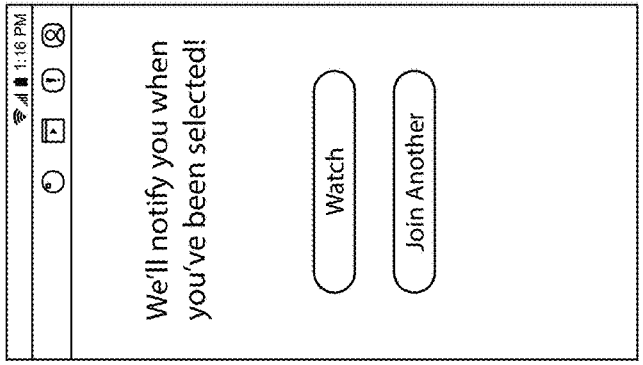
FIG. 9C3
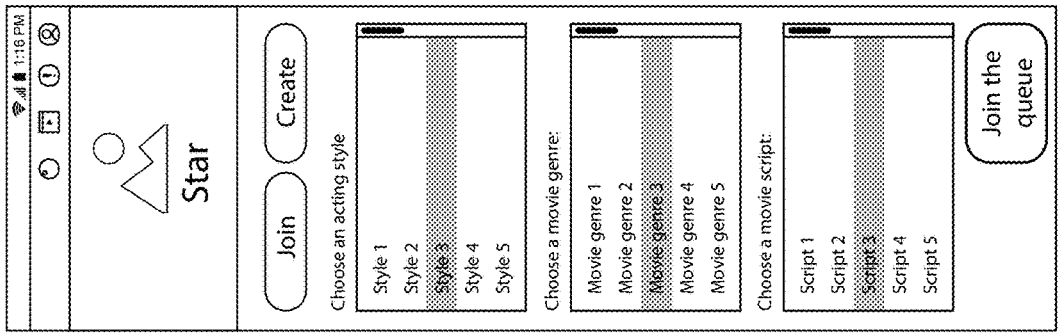
FIG. 9C2
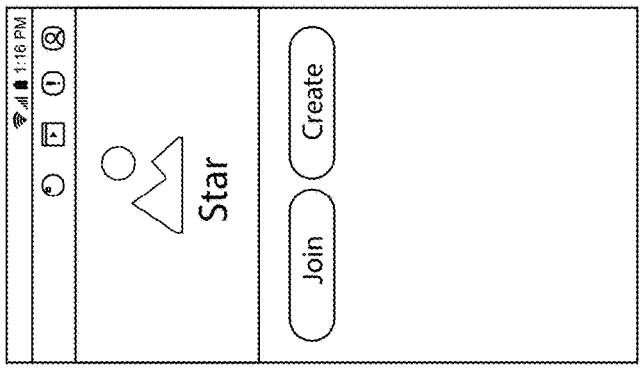
FIG. 9C1

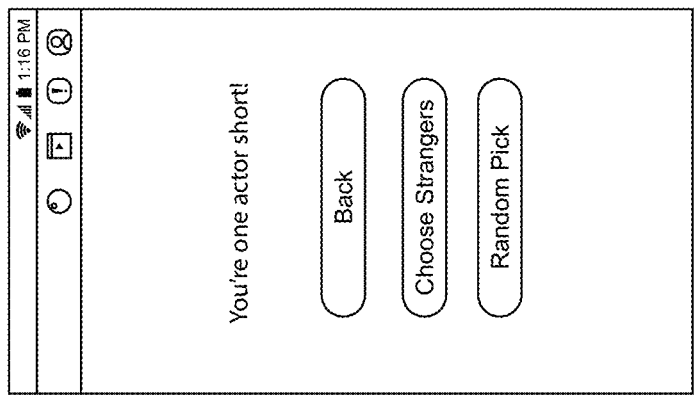
FIG. 9D1
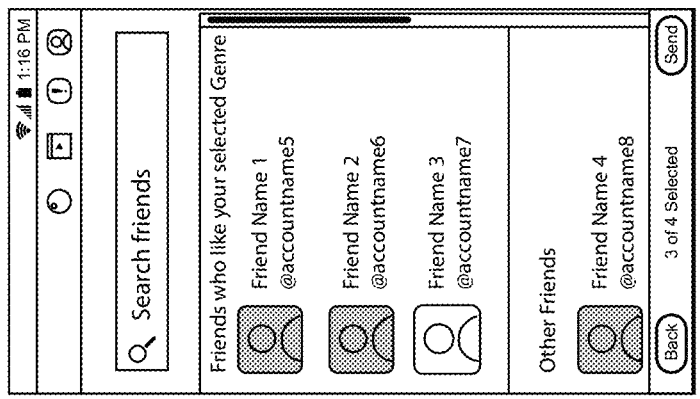
FIG. 9D2
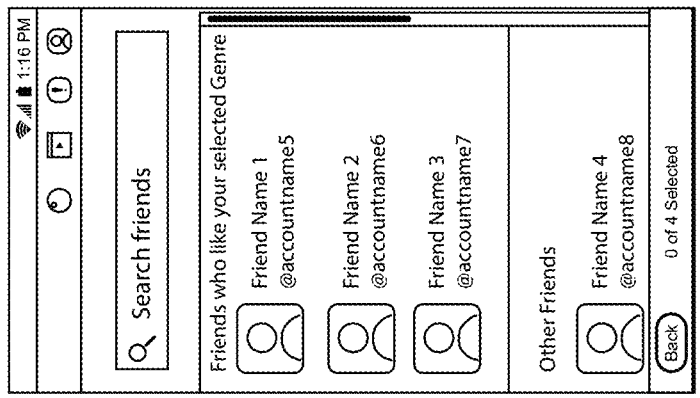
FIG. 9D3
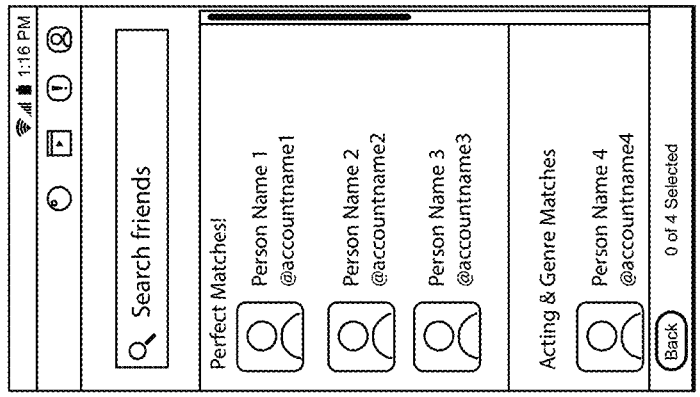
FIG. 9D4

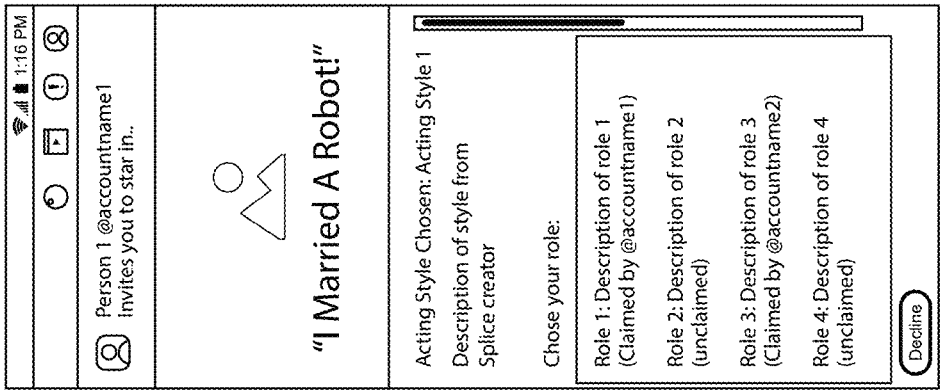
FIG. 9E1  513
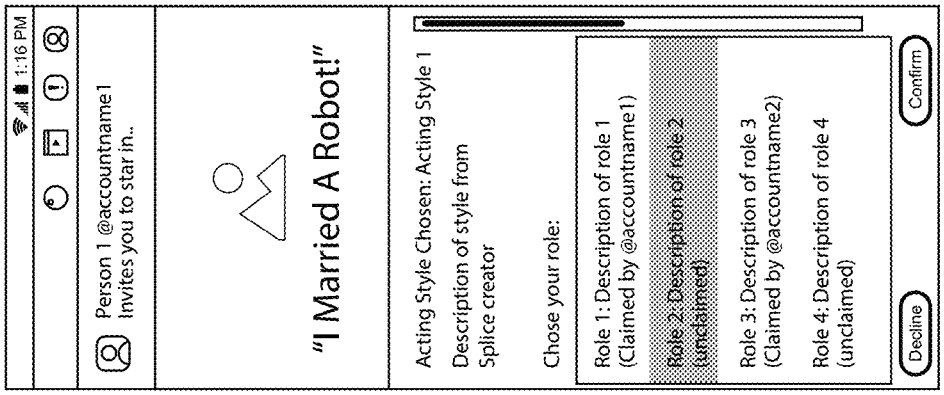
FIG. 9E2  514
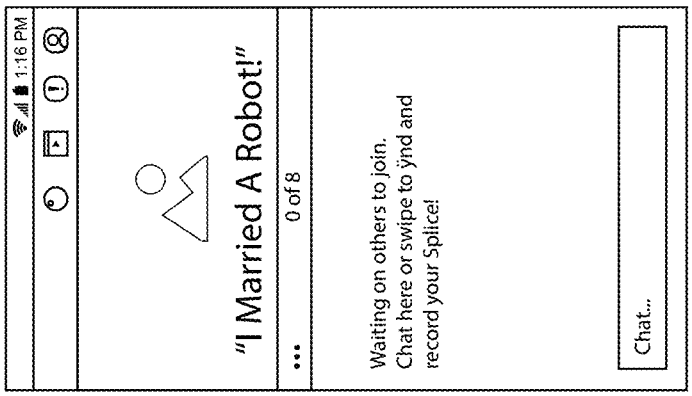
FIG. 9E3  515
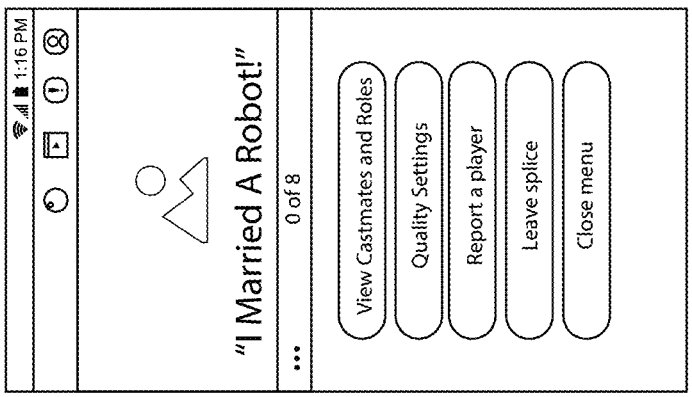
FIG. 9E4  516

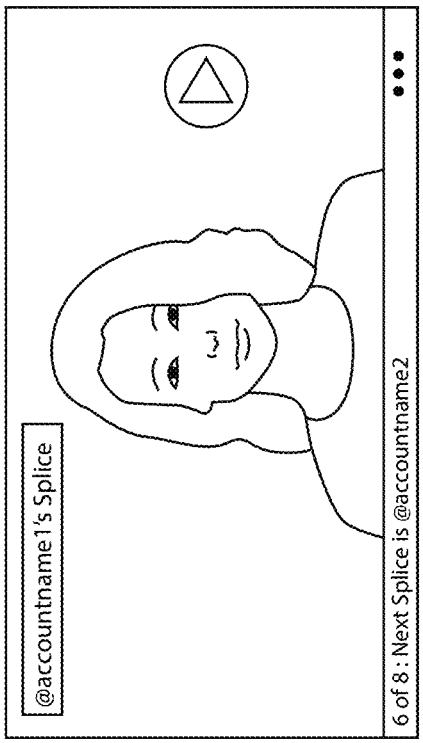
FIG. 9F3  519
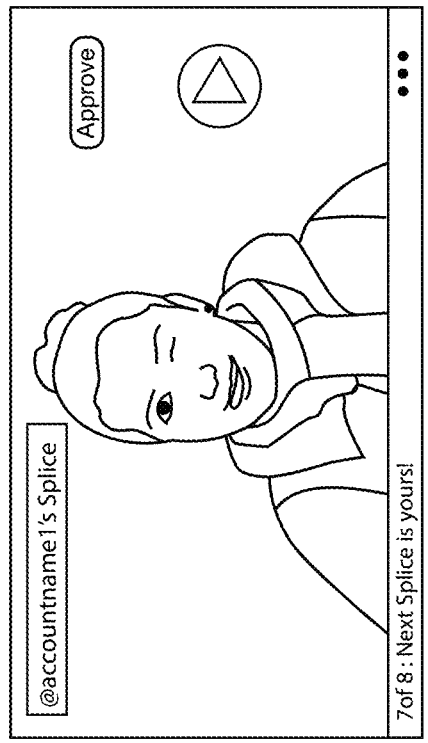
FIG. 9F4  520
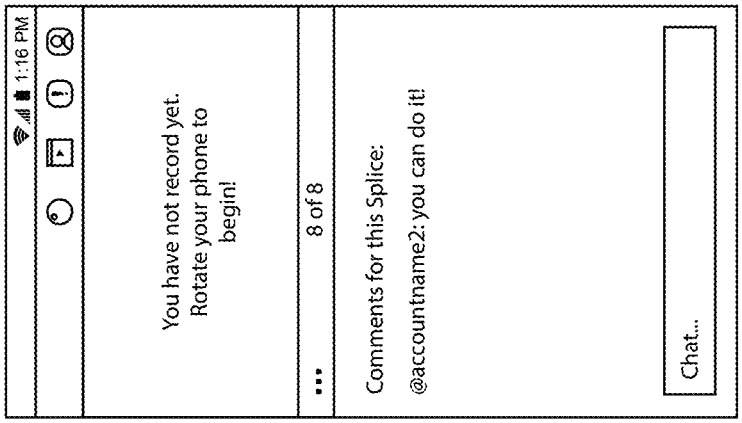
FIG. 9F2  518
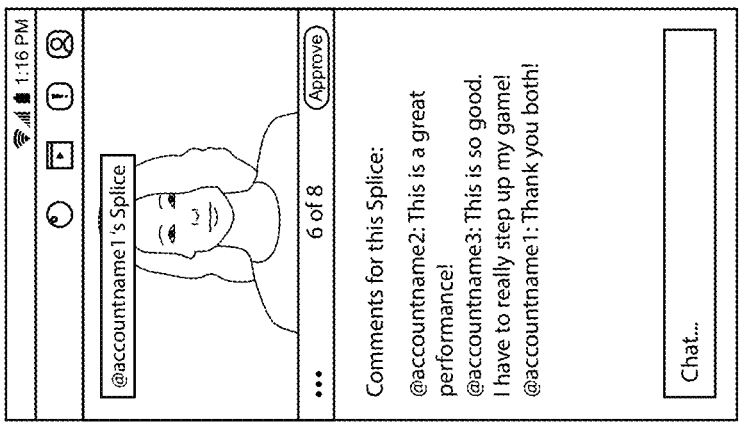
FIG. 9F1  517

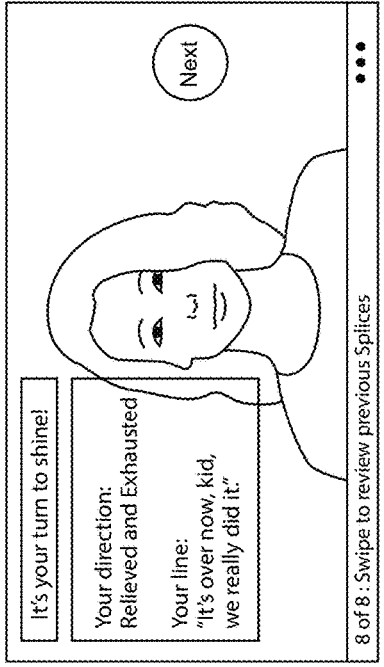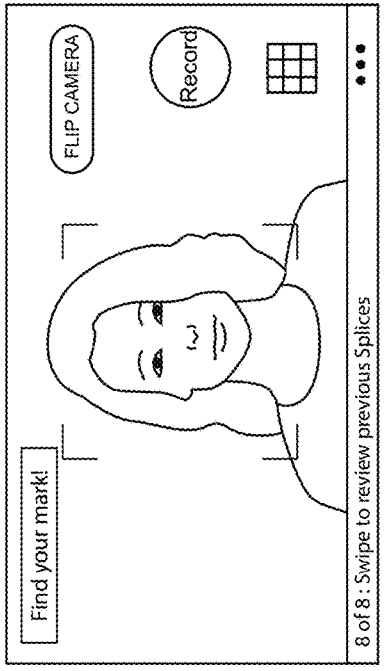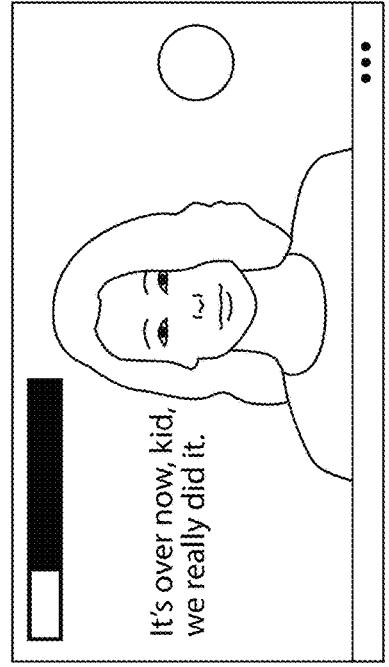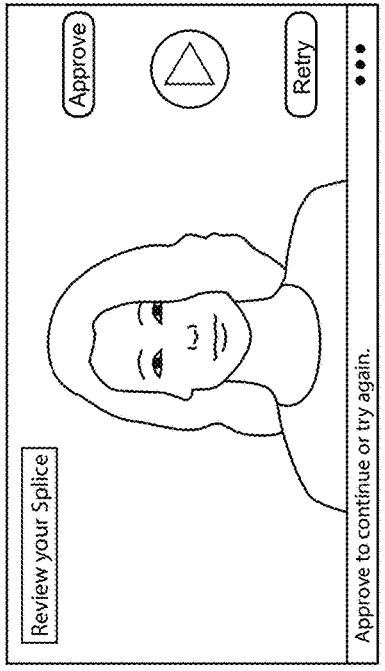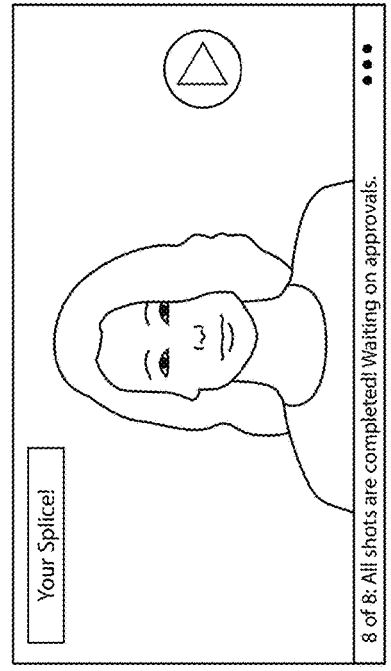

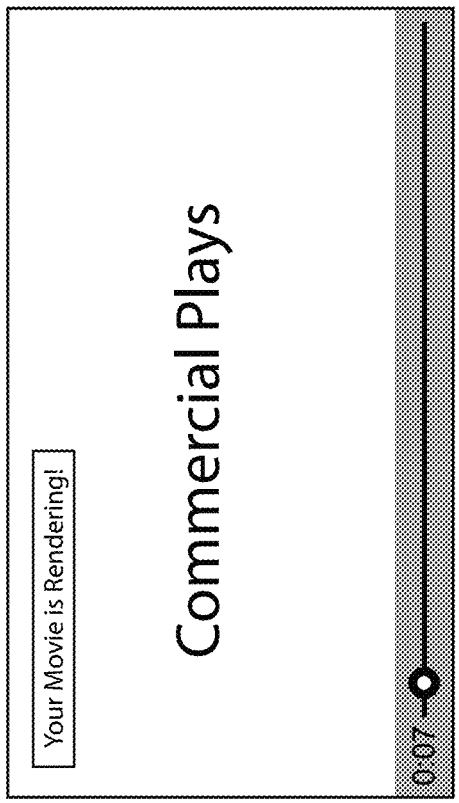
526 FIG. 9H1
527 FIG. 9H2
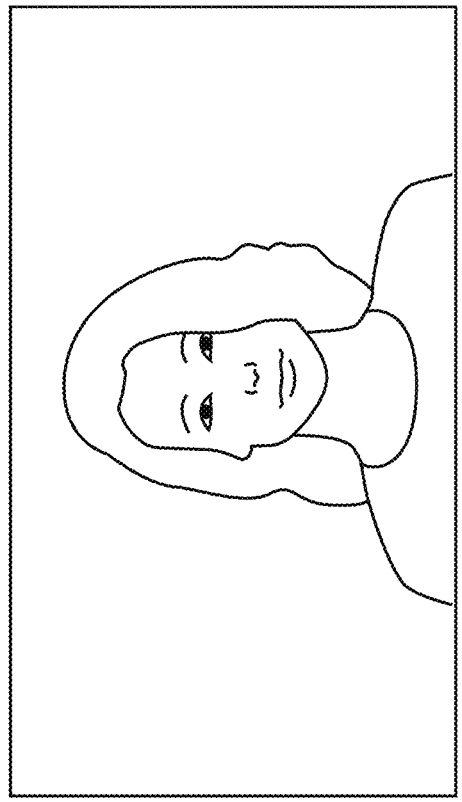
528 FIG. 9H3
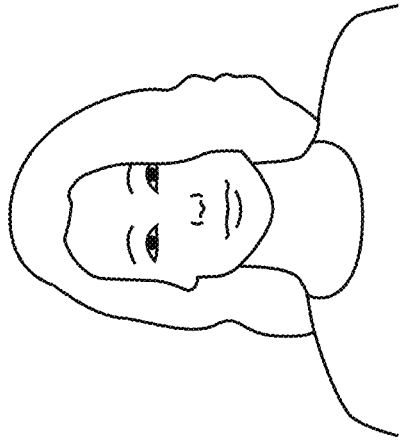
529 FIG. 9H4

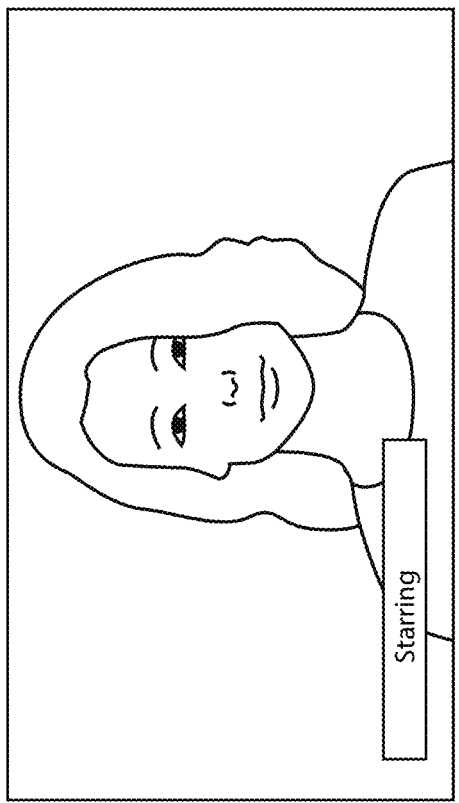
531 FIG. 9H6
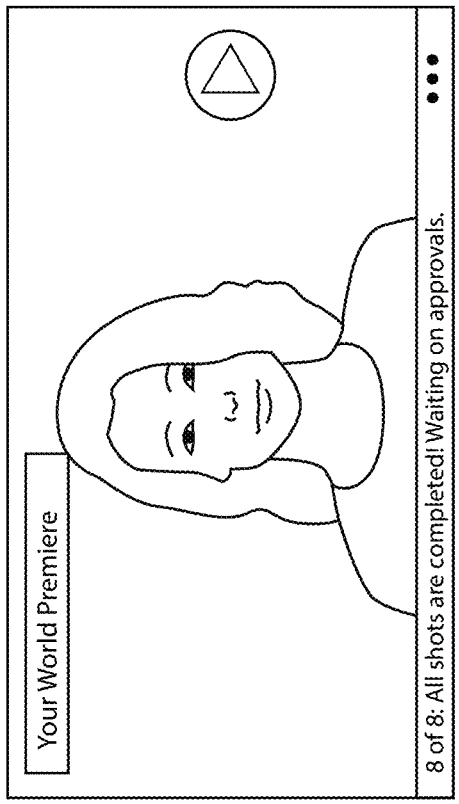
530 FIG. 9H5
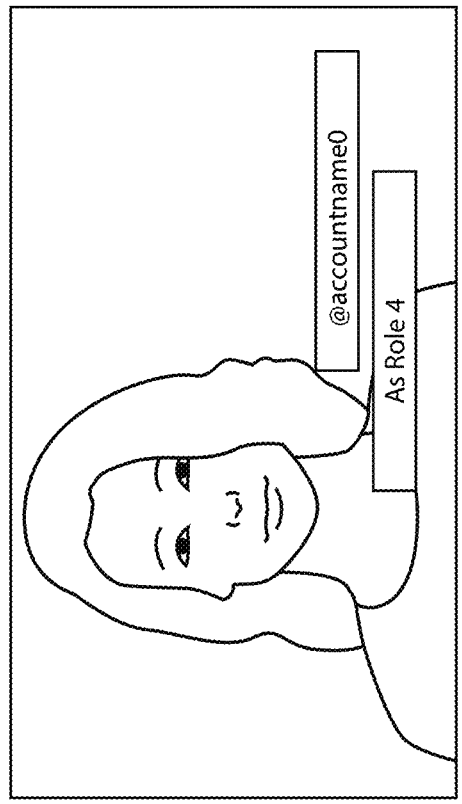
532 FIG. 9H7

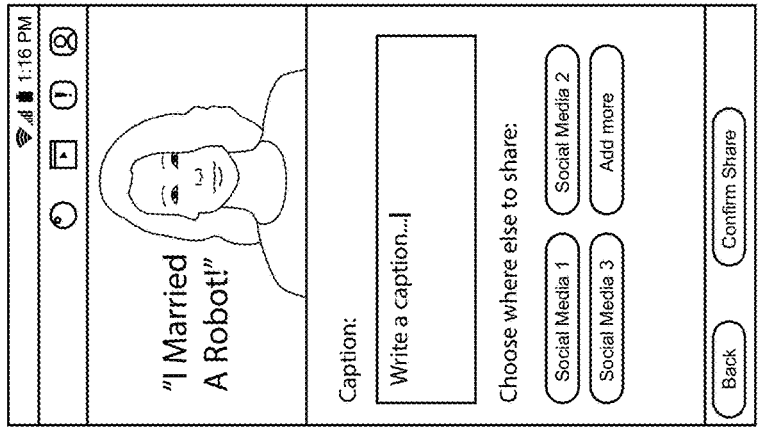
FIG. 9I2  535
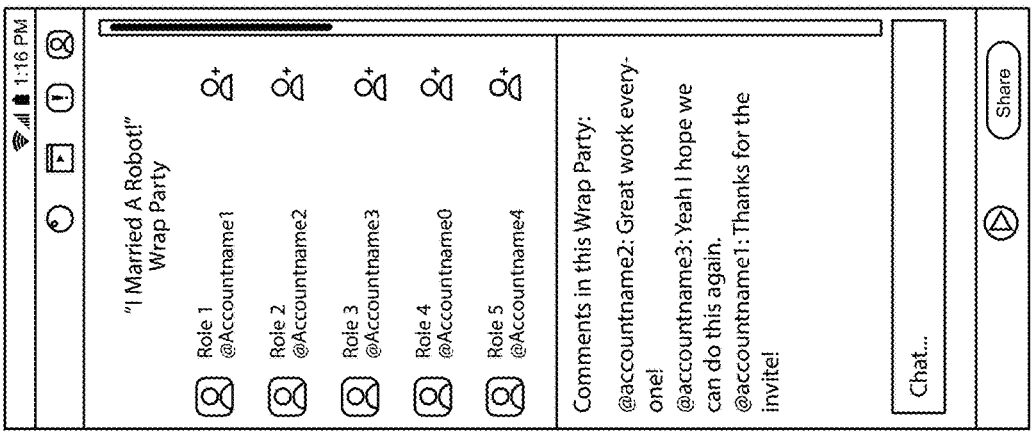
FIG. 9I1  534
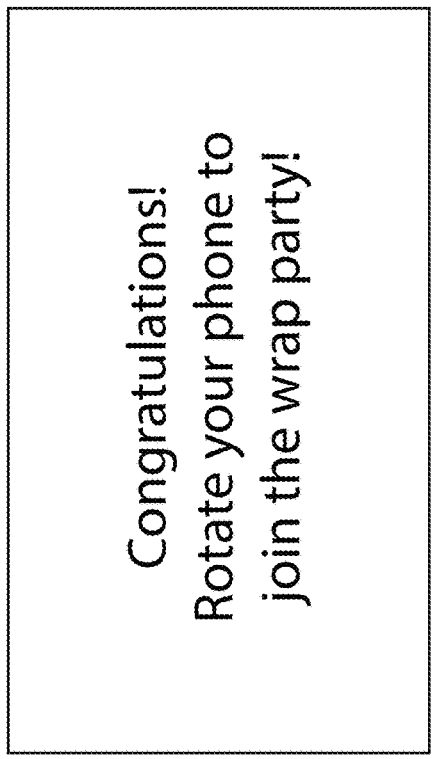
533  FIG. 9H8

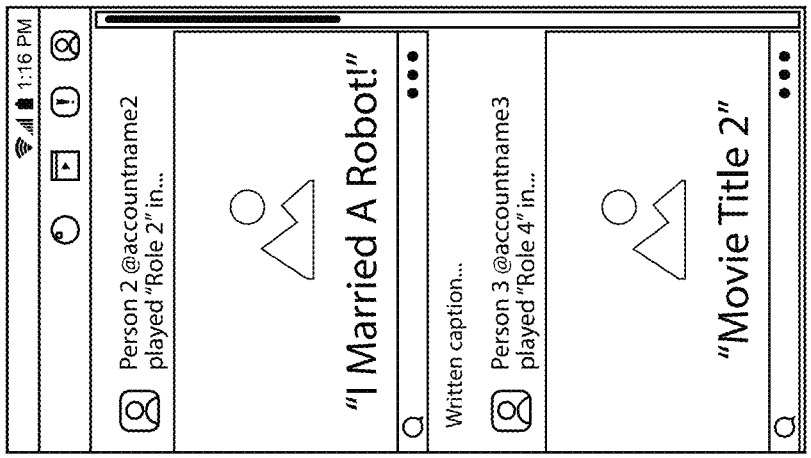
FIG. 9J1
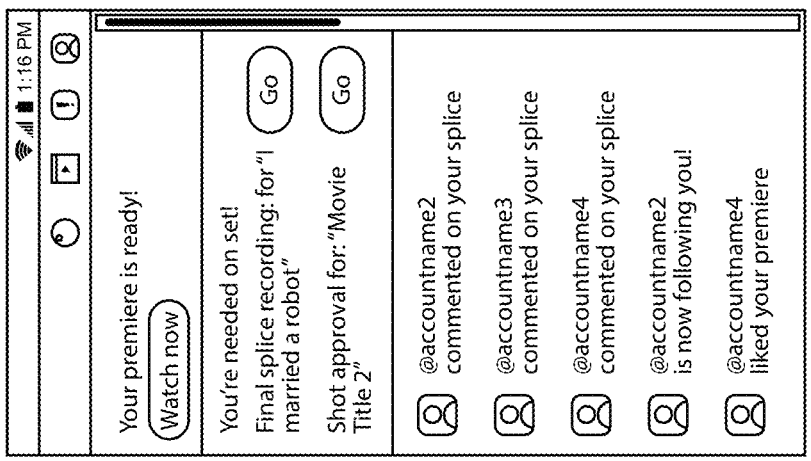
FIG. 9J2
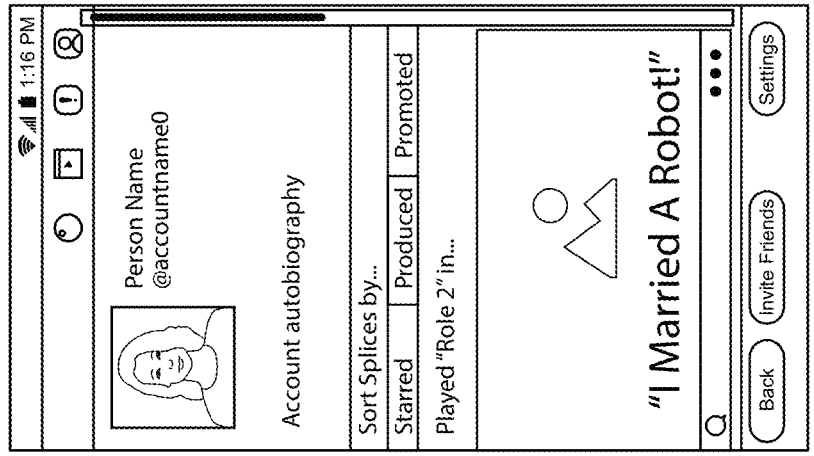
FIG. 9J3

SYSTEM AND METHOD FOR THE COLLABORATIVE CREATION OF A FINAL, AUTOMATICALLY ASSEMBLED MOVIE

CLAIM OF PRIORITY/CROSS-REFERENCE TO RELATED APPLICATION

The present application is based on and a claim of priority is made under 35 U.S.C. § 119(e) to provisional patent application Ser. No. 62/740,212, filed on Oct. 2, 2018, the content of which is incorporated herein in its entirety by reference.

FIELD OF THE INVENTION

The present invention is generally directed to a system and method for collaboratively creating a movie or video, and more specifically, to a system and method that asynchronously receives a plurality of clips from a group of users, automatically processes the clips by adding effects, filters, overlays, audio, music, etc., and automatically assembles the clips into a final movie based upon a predetermined or preselected template or script.

BACKGROUND OF THE INVENTION

Mobile devices and social media platforms are ubiquitous in today's society, however, the social networking platforms available, such as, for example, FACEBOOK®, INSTAGRAM®, and the like, lack the ability for its user's to collaboratively create multimedia content, such as movies and videos.

There is, thus, a need in the art for a new social networking platform, system or method that allows its users to collaboratively create movies, videos, etc. from a collection of movie scripts. For example, the users would be able to select a movie script from a list or collection of scripts and invite users to join a movie-making group. Users are able to create clips using their mobile or other user devices, then upload or communicate those clips to the system, where they are automatically processed and automatically combined or aggregated to create a final movie.

SUMMARY OF THE INVENTION

Accordingly, the present invention is generally directed to a social networking platform embodied in a system, method, or application for collaboratively creating an automatically assembled movie. In particular, the system or method of the present invention may identify a predefined movie script, for example, when a user of the system or method selects a script from a collection of scripts. Specifically, a script, as used herein, may be a collection of components (e.g., list or description of character roles, dialogue lines, performance instructions, cues, images, audio clips, audio effects, video effects, filters, pre-made content, dynamically made content, etc.) that define the movie from which the script is based. The script can include a list or collection of media, videos, audio, sounds, images, text, pictures, filters, effects, etc. that are user-made, pre-made or dynamically generated and which are ultimately compiled into the final movie. For instance, the script, of at least one embodiment describes or represents the blueprint, framework and plan for the final movie.

Once a script is selected, a group of participating users is created—the participating users being users of the system or method that will participate in the creation of the final movie. In one embodiment, creating the group may be accomplished by inviting participating users to join a movie making group. After participating users are identified and added to the group, the system or method of at least one embodiment will assign each of the participating users of the movie making group to at least one of the plurality of character roles defined by or identified in the selected script. In at least one embodiment, the participating users are able to choose or select a character role.

With the group created and the character roles assigned, for each of the character roles, the system and/or method of at least one embodiment will receive, from a user device, at least one raw or pre-processed media clip recorded by the user in accordance with performance instructions (e.g., dialogue lines, indication of mood and/or positioning, etc.) In one embodiment, the raw or pre-processed media clips are recorded by the users asynchronously or on the user's time.

After the clips are created, they are uploaded to the a server or other computer-based system where they will be automatically processed in at least one embodiment and in accordance with the script. For example, a processing module may be used to automatically apply filters, visual effects, add graphics, etc. according to the script or script rules.

Once all of the media clips are processed, the system will combine or aggregate all of the processed media clips into a predefined order according to the predefined movie script to create a final movie. The final movie is then distributed to the participating users, for example, via the social networking platform or application of at least one embodiment, where the users can share the final movie with other social networking platforms, if desired.

These and other objects, features and advantages of the present invention will become more apparent when the drawings as well as the detailed description are taken into consideration.

BRIEF DESCRIPTION OF THE DRAWINGS

FIG. 1 is a schematic representation of the system as disclosed in accordance with at least one embodiment of the present invention.

FIG. 6 is an exemplary block diagram illustrating how the system or method of at least one embodiment of the present invention may assembly processed media clips and combine them with other content, such as pre-created content.

FIGS. 8A, 8B and 8C illustrate a flow diagram of exemplary screenshots of at least one embodiment of the present invention.

FIG. 9C1 is an exemplary screenshot illustrating a user-option to either join a group or create a new group as disclosed herein.

FIG. 9C2 is an exemplary screenshot illustrating a plurality of join-group options available in the event the user chooses to join an existing group.

FIG. 9C3 is an exemplary screenshot illustrating a user option to either watch already created movies or to join another group.

FIG. 9C4 is an exemplary screenshot illustrating a plurality of movie-creation options available to a user who chooses to create a new group or movie.

FIG. 9D1 is an exemplary screenshot illustrating a user searching for or finding users to invite to a group.

FIG. 9D2 is an exemplary screenshot illustrating a user searching for or finding "friends" to invite to a group.

FIG. 9D3 is an exemplary screenshot illustrating a user inviting other users to join a group as disclosed herein.

FIG. 9D4 is an exemplary screenshot illustrating the system or method prompting the user with an indication that there are not enough users in the group.

FIG. 9E1 is an exemplary screenshot illustrating a participating user selecting a character role within the group.

FIG. 9E2 is an exemplary screenshot illustrating a participating user confirming her character role within the group.

FIG. 9E3 is an exemplary screenshot illustrating a chat and review carousel as disclosed in accordance with at least one embodiment herein.

FIG. 9E4 is an exemplary screenshot illustrating a chat and review menu as disclosed in accordance with at least one embodiment herein.

FIG. 9F1 is an exemplary screenshot illustrating a participating user reviewing and approving other participants' media clips uploaded or created in the group.

FIG. 9F2 is an exemplary screenshot illustrating a user clip menu or upload screen as disclosed herein.

FIG. 9F3 is an exemplary screenshot illustrating a participating user (@accountname1) waiting for her turn to record a media clip as disclosed in accordance with at least one embodiment of the present invention.

FIG. 9F4 is an exemplary screenshot illustrating the participating user from FIG. 9F3 still waiting for her turn to record a media clip as disclosed in accordance with at least one embodiment of the present invention.

FIG. 9G1 is an exemplary screenshot illustrating the system or method prompting the user on the user device with performance instructions as disclosed in accordance with at least one embodiment of the present invention.

FIG. 9G2 is an exemplary screenshot illustrating instructing the user to align herself within the camera frame.

FIG. 9G3 is an exemplary screenshot illustrating a user in the process of recording a media clip as disclosed in accordance with at least one embodiment herein.

FIG. 9G4 is an exemplary screenshot illustrating a user reviewing her media clip as disclosed herein.

FIG. 9G5 is an exemplary screenshot illustrating a user approving her media clip as disclosed herein.

FIGS. 9H1-9H8 are an exemplary screenshots illustrating the final movie being played to the user on the user device.

FIG. 9I1 is an exemplary screenshot illustrating a post-movie chatroom as disclosed in accordance with at least one embodiment.

FIG. 9I2 is an exemplary screenshot illustrating a user sharing the final movie to another social media platform.

FIG. 9J1 is an exemplary screenshot illustrating a user being shown a plurality of already created movies from which she can watch.

FIG. 9J2 is an exemplary screenshot illustrating a plurality of notifications generated and sent to the user as disclosed in accordance with at least one embodiment herein.

FIG. 9J3 is an exemplary screenshot illustrating a user profile of at least one embodiment of the present invention.

Like reference numerals refer to like parts throughout the several views of the drawings provided herein.

DETAILED DESCRIPTION OF THE INVENTION

Figure 3A:
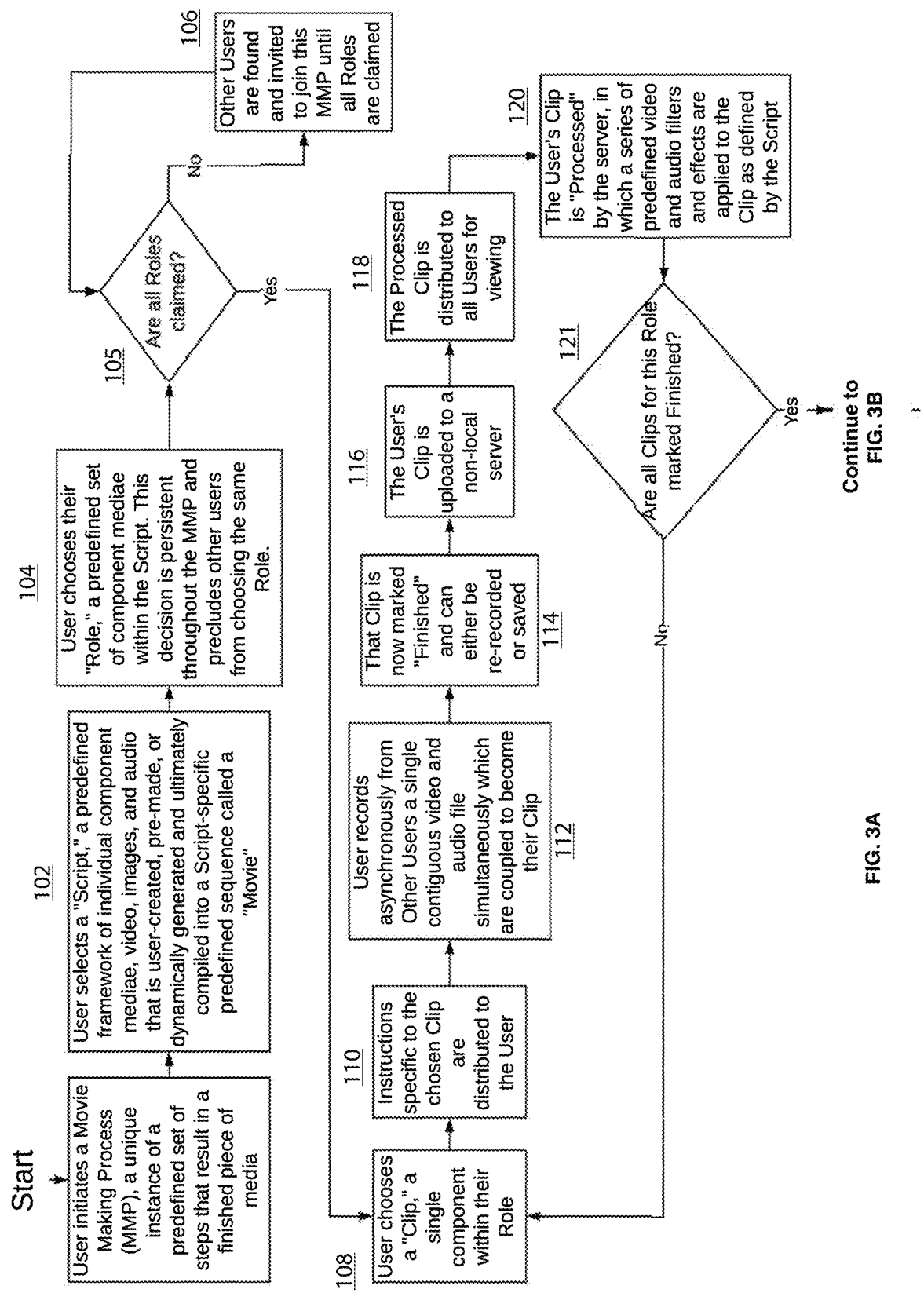
FIGS. 3A and 3B collectively show a flow chart illustrating the method as disclosed in accordance with at least one embodiment of the present invention.
Figure 3B:
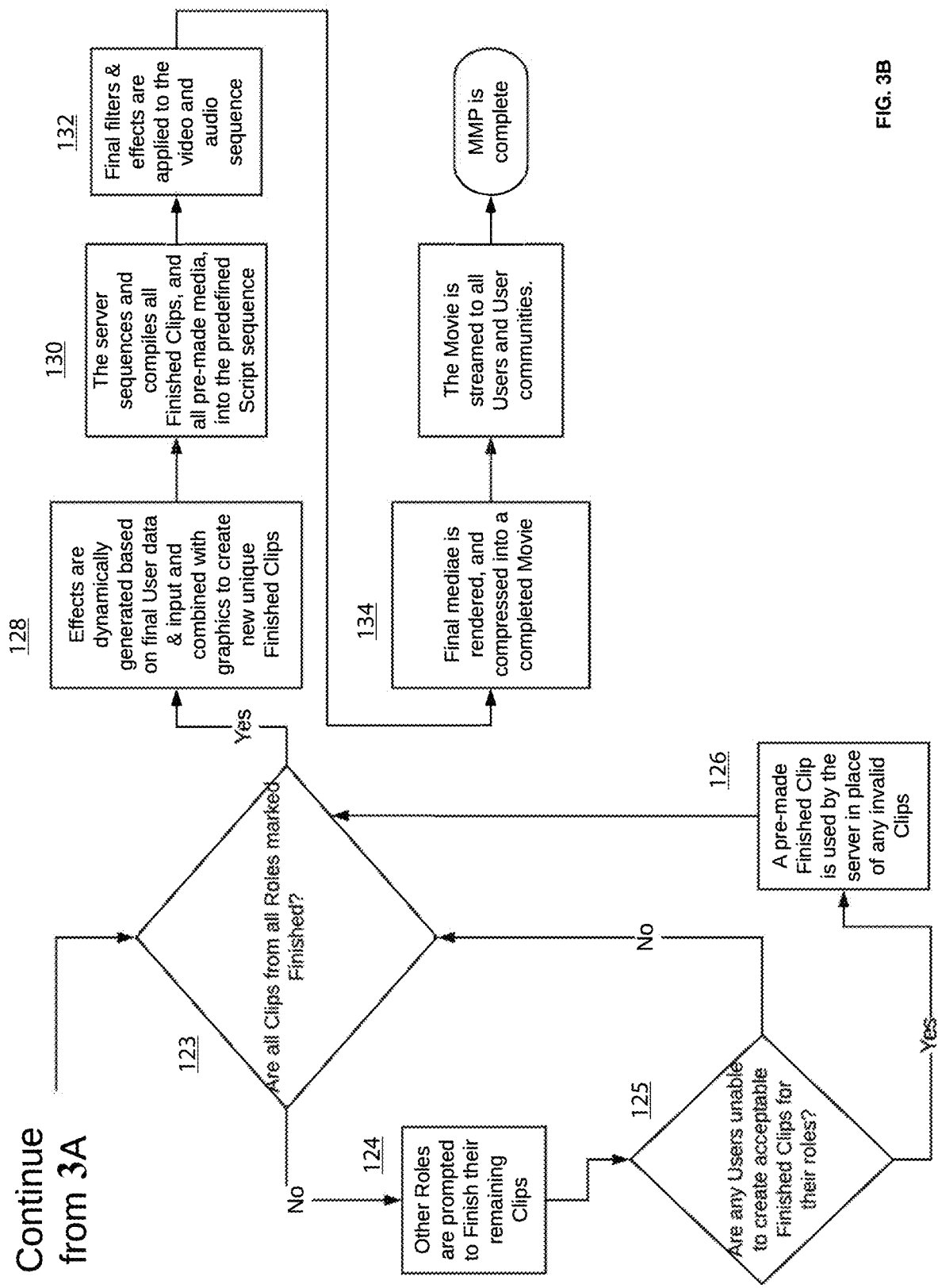

As shown in the accompanying drawings, and with particular reference to FIGS. 1, 3A and 3B, the present invention is directed to a system 10 and method 100 for the collaborative creation of an automatically processed and assembled movie. More in particular, as described herein, an initiating or participating user 20 will select a script from a list or collection of premade movie scripts, or will join a group of users that have already selected a movie script. Each participating user 20 will be assigned to a character role, for example, by choosing a character role provided by the system 10 or method 100 based on the selected script.

The system 10 or method 100 of at least one embodiment will provide each participating user 20 with guided instructions, for example, in the form of dialogue or verbal lines, prompts, directions, or other performance instructions, as the user records or captures a clip via a user device 30, such as a mobile phone or terminal. The clips are then uploaded or communicated from the user device 30 to a movie management system or server 40 where the clips are automatically processed (e.g., by adding filters, music, audio, text, overlays, graphics, images, etc.) by a processing module and assembled according to the selected script via an aggregation module. The movie is then distributed to the participating users 20 and in some cases to other external or third-party locations, for example, other social networks.

Furthermore, with reference to the schematic or diagram represented in FIG. 1, the system 10 of at least one embodiment includes a content or movie management system 40 disposed in a communicative relation with a plurality of user devices 30, for example, via a network 15. As an example, the network 15 may include virtually any computer, communication or data network such as the World Wide Web, Internet, Intranet, Wide Area Network(s), Telecommunication Network(s) (e.g., 3G, 4G, 5G, LTE), etc. Moreover, the management system 40 of certain embodiments is structured to manage and/or store account or profile information (e.g., usernames, passwords, account information, contacts, etc.) and facilitate the creation, management, transmission and/or distribution of movies and other media via the one or more applications 40 and/or modules as described herein.

Figure 2A:
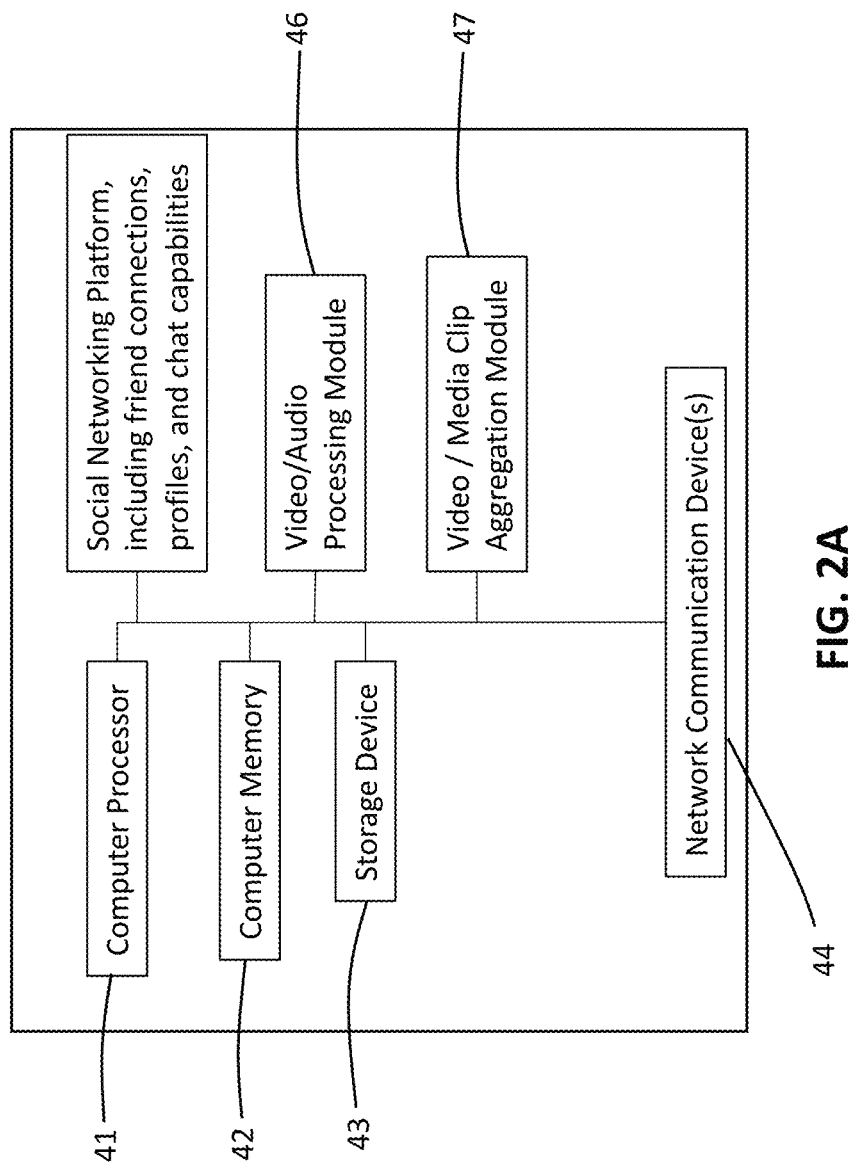
FIG. 2A is a block diagram illustrating the movie management system as disclosed in accordance with at least one embodiment of the present invention.

For example, the management system 40 of at least one embodiment the present invention may include a web or cloud-based computer or server, desktop computer, laptop computer, tablet, mobile or handheld computer, etc. capable of facilitating implementation of the present invention disclosed herein. Particularly, with reference briefly to the schematic representation or block diagram of the management system 40 provided in FIG. 2A, it is noted that the platform/system 40 of at least one embodiment includes, among other components and devices structured to facilitate implementation of the present invention in the intended manner, a computer processor 41, memory 42, a data storage device 43, and communication or network device(s) 44.

Specifically, as used herein, the processor 41 of at least one embodiment may include any device cooperatively structured to execute or implement computer instructions, software, etc., including, for example, the various features and components as described in accordance with at least one embodiment of the present invention and configured to implement or facilitate the implementation of the method 100 herein. Further, the memory device 42 as used herein, may include but is not limited to random access memory (RAM) or other like devices configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal. The data storage device 43, as used herein, may include a hard disk drive, CD/DVD, USB drive, solid state drive, virtual drive, could-based storage drive, or other types of volatile or non-volatile memory. Moreover, the communication device 44 may include a network communication hardware/software component structured to facilitate communication between the management platform/system 40 of the present invention and the various user devices 30.

Furthermore, the user devices 30 of certain embodiments or implementations of the present invention may include mobile devices or mobile terminals such as, but not limited to mobile phones, smartphones, tablet computers, etc., although it is contemplated that the user devices 30 may also include laptop or mobile computers, desktop computers, video game consoles, mobile video game devices, etc. Accordingly, in some embodiments or implementations, the user or mobile device(s) 30 may include, for example, an APPLE® iPHONE®, ANDROID® based phone, etc. In any event, the user devices 30 of the various embodiments are capable of accessing one or more of the mobile applications 40 described herein.

Figure 2B:
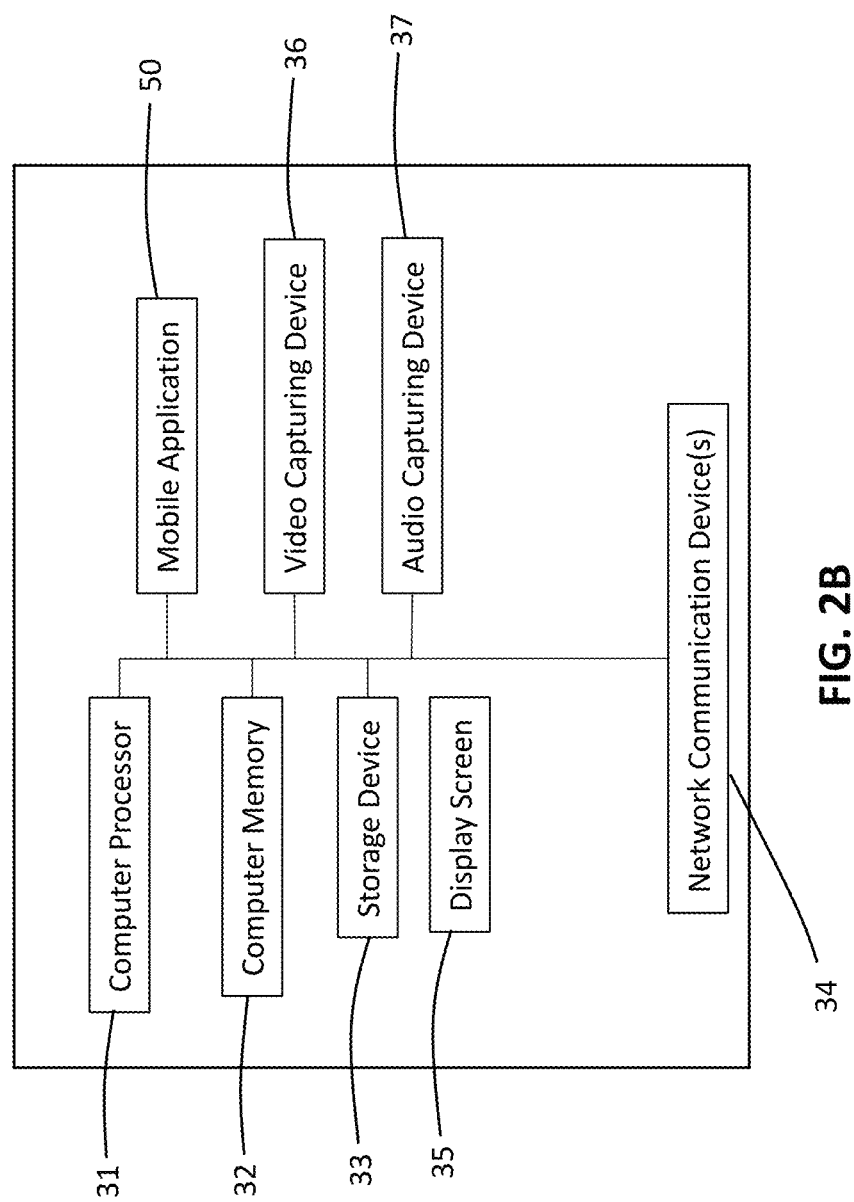
FIG. 2B is a block diagram illustrating the user device as disclosed in accordance with at least one embodiment of the present invention.

With reference to the schematic representation or block diagram of at least one exemplary user device 30 as provided in FIG. 2B, it is noted that the user device(s) 30 of at least one embodiment includes, among other components and devices structured to facilitate implementation of the present invention in the intended manner, a computer processor 31, memory 32, a data storage device 33, and communication or network device(s) 34. Furthermore, the mobile or user device(s) 30 includes a display screen 35, such as a touchscreen or other screen. Other features or structures of the user device(s) 30 include, but are not limited to, a camera 36 or other video capturing device and a microphone or other audio capturing device.

Moreover, as used herein, the processor 32 of at least one embodiment may include any device cooperatively structured to execute or implement computer instructions, software, etc., including, for example, the various features and components as described in accordance with at least one embodiment of the present invention and configured to implement the method 100 herein. Further, the memory device 32 as used herein, may include but is not limited to random access memory (RAM) or other like devices configured to implement the present invention in the intended manner, for example, by storing and assisting with the execution of one or more applications, modules, or components capable of implementing the system 10 and method 100 described herein. It should be noted that non-transitory computer readable media includes all computer-readable media except for a transitory, propagating signal. The data storage device 33, as used herein, may include a hard disk drive, CD/DVD, USB drive, solid state drive, virtual drive, could-based storage drive, or other types of volatile or non-volatile memory. Moreover, the communication device 34 may include a network communication hardware/software component structured to facilitate communication with the network 15.

In some cases, the user device 30 may have a mobile or other application, referenced as 50, downloaded and installed or otherwise accessible thereto. The application 50 may be specifically configured to facilitate implementation of the various embodiments disclosed herein, for example, by providing an interface for creating clips, uploading or communicating clips to the management system 40, viewing or downloading clips prepared by other users, viewing or downloading movies or other media created in accordance with at least one embodiment herein, communicating with other users, for example, via text, audio or video chat, etc. In other cases, a user 20 may access the system 10 or method 100 in other ways, for example, by using a web browser on the user device 30.

Furthermore, with reference now to FIGS. 3A and 3B, the method 100 of at least one exemplary embodiment of the present invention is illustrated. In particular, the method 100 may often begin when a user 20, for example, an initiating user, logs into the management system 40, e.g., by providing log-in credentials such as a username and password, biometric credentials, etc. via the application 50, a web browser, etc. The method 100 continues with identifying or selecting a movie script. In some embodiments, the identifying or selecting a movie script is accomplished when a user 20 selects a script or script identifier (e.g., a script title or description) from the list or collection of scripts. In other embodiments, identifying or selecting a script can occur automatically by the system 10 or method 100, randomly, or other manner.

For instance, in at least one embodiment, once the user is logged into the system or network, as shown at 102 in FIG. 3A, he or she can select a script (or script identifier that is associated with a script) from which the final movie will be created. Specifically, a script, as used herein, is a collection of components that define the movie from which the script is based. As an example, the script can include dialogues, identification or descriptions of one or more character roles, plots, character movements or actions, performance instructions, descriptions of scenes, etc. The script can include a list or collection of media, videos, audio, sounds, images, text, pictures, filters, effects, etc. that are user-made, pre-made or dynamically generated and which are ultimately compiled into the final movie. For instance, the script, of at least one embodiment describes or represents the blueprint, framework and plan for the final movie. Furthermore, in at least one embodiment, the script includes script rules, such as processing rules or instructions, which direct or instruct the processing module what filter or effects to apply to recorded or captured video clips. In some cases, the script rules may also include aggregation rules or instructions which direct or instruct the aggregation module how to combine or aggregate the video clips. It should be noted that in some cases, the users, e.g., participating users of the system 10, method 100 or application 50, may not have access to all of the components of the script. Rather, in some cases, the users may see a script title, brief description, dialogues, etc., but may not access certain script rules, for example. It should also be noted that the script can be considered predefined in that the scripts are already made, defined or otherwise created before the user selects one.

Figure 4A:
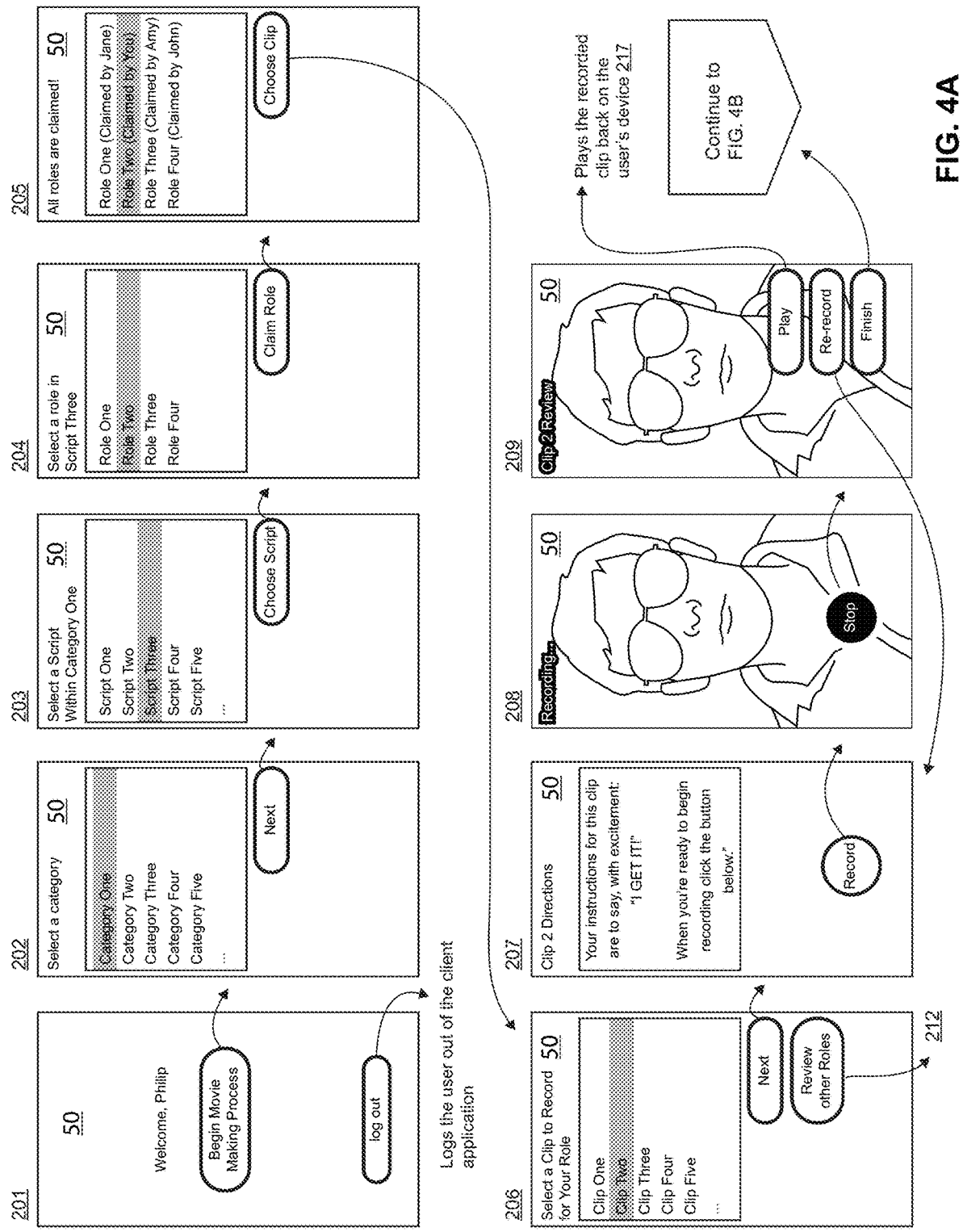
FIGS. 4A and 4B collectively show a flow diagram with exemplary screenshots as disclosed in accordance with at least one embodiment of the present invention.

With reference now to FIG. 4A a flow diagram showing exemplary screenshots of a user operating a user device 30. The screenshots can be of the mobile application 50 installed on or accessed by the user device 30 or of a web browser accessing a web site. In any event, for example, as shown at 201, the user is logged in and can either begin the movie making process or log out. Selecting to begin the movie making process will transition the interface on the user device 30 to allow the user to select a script, as shown at 202 and 203. In one example, the scripts are grouped into a plurality of categories, labeled as "Category One," "Category Two," "Category Three," "Category Four," and "Category Five." This labelling is provided for illustrative purposes, although it should be noted that the categories can be, for example, action, comedy, horror, etc. As shown at 203, the user is able to select a script or script identifier (e.g., script title or label) from within the selected category. In the example, the scripts are labeled with the following script titles or identifiers: "Script One," "Script Two," "Script Three," "Script Four," and "Script Five," although it should be noted that unique script titles or identifiers can be used instead.

Furthermore, it should be noted that in other embodiments, the system 10 or method 100 may provide the user with information about the scripts, in addition to or instead of the category shown at 202 and/or the title or identifier shown at 203 in order to assist the user in selecting a script. For example, a short description can be displayed or provided, a sample or short video can be displayed or provided, some or all of the script dialogue, text, character roles, etc. can be displayed or provided, etc.

Next, as shown at 104-106 in FIG. 3A and as exemplified at 204-205 in FIG. 4A, the method 100 continues by assigning or otherwise linking each of the character roles defined in the script with a user or user account. In particular, each role or character role is often identified by the character's name or a description of the character defined by the selected script. For example, a movie or movie script may define or include four (or more, or less) characters which can be acted out by four (or more, or less) different actors/ actresses, such as the participating users 20 of the present invention. In some cases, the number of character roles will be the same as the number of participating users.

In at least one embodiment, the assignment of character roles to users or user accounts can be accomplished by each user choosing or selecting his or her role. In other embodiments, it is also contemplated that the initiating user (e.g., the user who initiated the movie making process) is able to assign character roles to different users or user accounts, or the system 10 or method 100 can automatically assign character roles to users or user accounts.

With reference to the exemplary screenshots represented at 204 and 205 in FIG. 4A, the selected script ("Script Three") includes four roles ("Role One," "Role Two," "Role Three," and "Role Four.") The user is able to select or highlight a particular role, and claim the role, for example, by clicking on the "Claim Role" button or an equivalent. In the exemplary embodiment illustrated in FIG. 4A, the initiating user selected "Role Two."

As shown at 105 and 106 in FIG. 3A, other users are found or invited to join the group and claim a character role. For example, the initiating user may select or identify other users of the system or method, for example, his friends or connections in the system or method. Doing so will send a notification to those other users who can decide to accept and join the group, or decline. In other embodiments or in other instances, the system 10 or method 100 can invite other users, which can be based on the users' preferences or profile. As an example, if the script selected is within a comedy category, the system 10 or method 100 can invite other users who may have identified comedy scripts as a preference.

In any event, with reference again to FIG. 4A, in the example illustrated, user Jane claimed "Role One," the initiating user claimed "Role Two," user Amy claimed "Role Three," and user John claimed "Role Four." These users are now part of a group of users or a group of user accounts that will collectively participate in the creation of a final movie based upon the selected script, in this example, "Script Three."

Figure 4B:
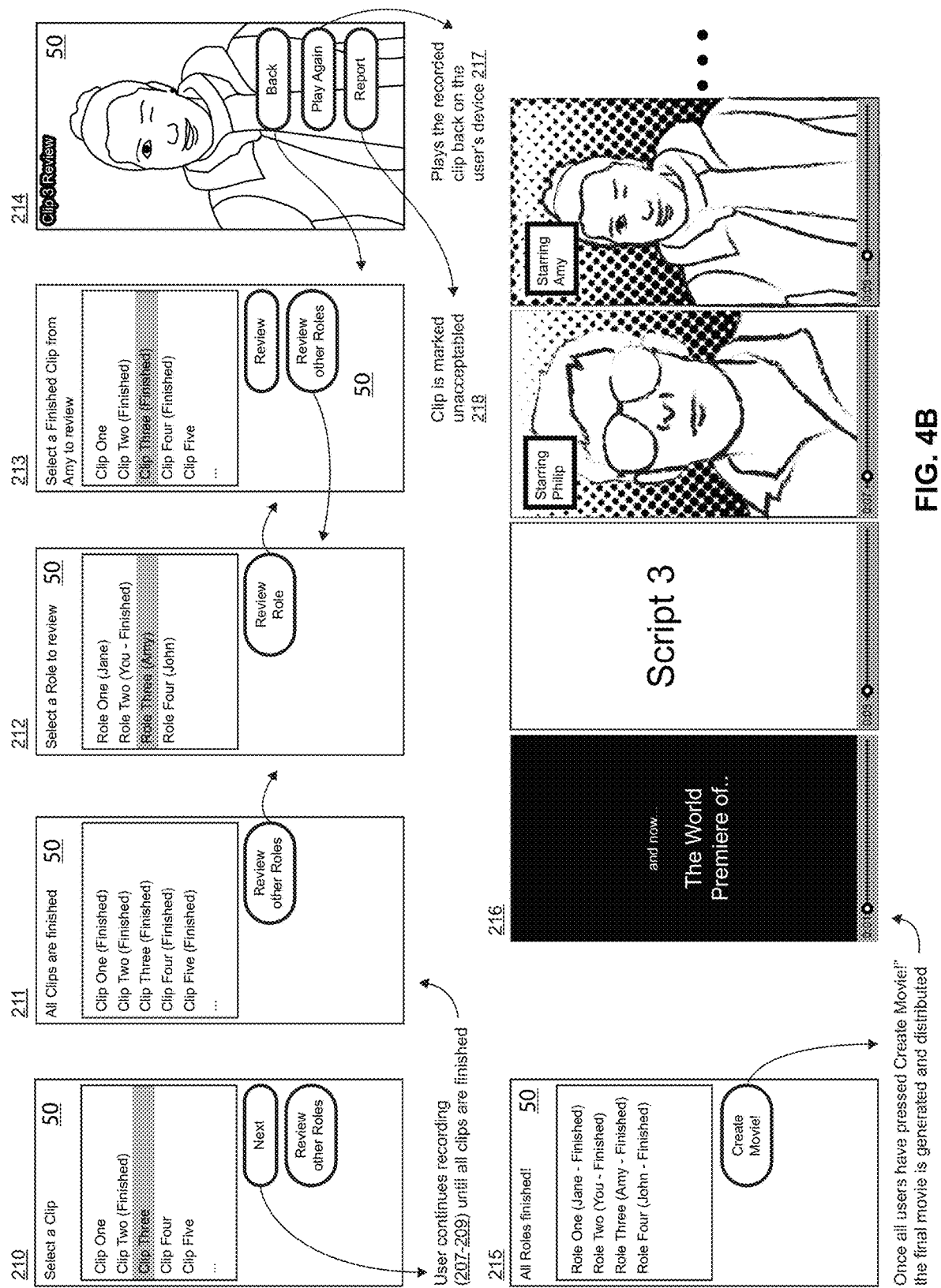

Furthermore, as shown at 108-116 in FIG. 3A and 206-211 in FIGS. 4A-4B, for each of the character roles, the method 100 of at least one embodiment includes capturing or receiving one or more raw media clips in accordance with or corresponding to performance instructions as defined by the script or character roles. In one embodiment, once all of the character roles are claimed, each user in the group can then proceed to begin creating raw media clips. In other embodiments, it should be noted that, as soon as a user claims a role, he or she is able to begin creating content or raw media clips—in other words, the user may not need to wait until all roles are claimed to begin creating content.

In any event, each character role will include one or more "clips" which need to be created or clip requests which need to be fulfilled, as defined by the corresponding or selected script. With reference to the example shown in FIG. 4A, "Role Two," which was selected by the user has at least five clips or clip requests, as shown at 206, and as identified by the titles "Clip One," "Clip Two," "Clip Three," "Clip Four," and "Clip Five," although other, more descriptive, titles can be used. As shown at 108 in FIG. 3A, when the user is ready to begin creating content or raw media files for the movie, the user will select a clip request. Upon doing so, the system 10 or method 100 will retrieve and/or communicate performance or clip instructions to the user, as shown at 110 and 207.

Specifically, the performance or clip instructions can include instructions or directions (for example, in written, audio, video or any combination) that directs or instructs the user how to create the corresponding clip or otherwise how to fulfill the corresponding clip request. The performance or clip instructions may, thus, include dialogue lines the user must recite while creating the content or recording the clip, positioning instructions (e.g., face to the left, tilt your head down, show from the top of your shoulders to the top of your head), acting instructions (e.g., act surprised or be excited), etc. With reference to FIG. 4A, the performance or clip instructions associated with the selected clip ("Clip Two") are: "say, with excitement: "I GET IT!" Of course, this is merely exemplary and other instructions can be included. In fact, in many cases, the instructions for one clip will likely be different than the instructions for another clip associated with the same character role.

With reference now to 112 in FIG. 3A and 208 in FIG. 4A, when the user is prepared to create the content, the user will press (or in some cases press and hold) a record or similar button. This will allow the user to record a raw media clip or content, for example, in the form of a single contiguous video and audio file. In some embodiments, the user is given an opportunity to play the video back (117), re-record the content if he or she so chooses, or mark the clip as "finished," or done, as shown at 114 and 209. As shown at 116, once the recorded clip is approved by the user, e.g., it is marked as finished or done, the user device 30 will transfer or upload the recorded clip to the management system 40 via network 15 where it will be processed and stored.

As shown at 121 and 201-211, the user will continue the process of recording content or recording raw or pre-processed media clips for each of the clip requests until all of the clip requests are fulfilled (FIG. 4B, 211). It should be noted that each user is able to fulfill the clip requests and upload the recorded clips to the server 40 at any time and in some embodiments in any order. In this manner, the users asynchronously record the media clips and the system 10 or method 100 asynchronously receives the recorded media clips from each of the users in the group. This means that as the clip requests are fulfilled by each user, e.g., as each user records media clips according to the clip requests, the system will receive those clips, and those clips do not need to be recorded in any particular order or sequence. Rather, the system 10 or method 100 will receive the recorded media clips and subsequently organize them according to the script to create the final movie, as disclosed herein.

As just an example, one user may decide to fulfill all of his clip requests in a single day, whereas another user in the same group may fulfill one clip request a day for five days, even though some of the second user's clips will eventually be sequenced before some of the first user's clips in the final movie.

Moreover, the system 10 and method 100 of at least one embodiment will make clips (either processed or in some embodiments raw or pre-processed) available for other users to view prior to the completion of the final movie, and in some cases, the users may accept or reject recorded clips from other users. In some embodiments, all users within the corresponding group (e.g., all users who are involved in the creation of the same movie) are able to view (and in some cases, accept or reject) the recorded media clips from other users in the group. In another embodiment, however, only the initiating user may be able to review, accept and/or reject media clips from other users in the group.

For example, as shown at 212 in FIG. 4B, one user may be able to review recorded clips provided by other users or otherwise associated with other roles from within the group. In the example shown, the user has selected to review "Role Three" assigned to user Amy. Upon doing so, the system 10 or method 100 identifies which clip requests have been fulfilled by user Amy in Role Three, which in the illustrated example, are clips Two, Three and Four, as shown at 213. As shown at 214, the user is then able to play the recorded clip (e.g., 217) or mark the recorded clip as "unacceptable," or otherwise reject the recorded clip. Upon rejecting a recorded clip, the system 10 or method 100 of at least one embodiment will notify the corresponding user (in this example, user Amy) to re-record the clip or otherwise re-fulfill the corresponding clip request.

It should also be noted that, as shown at 120 in FIG. 3A, the system 10 and method 100 will process the raw or pre-processed media clips or the media clips uploaded by the user and associated with a clip request. For example, the clips are processed according to the corresponding script or script rules and each clip created in accordance with the script may be processed differently than other clips corresponding to the same script. This processing in many embodiments is performed automatically by the system 10 or method 100, for example, by the management system 40, when (or at any time after) the media clip is uploaded or otherwise sent to the management system 40 by the user device 30.

In particular, the system 10 or method 100 of at least one embodiment of the present invention includes a processing module 46 which is a software and/or hardware component that is configured to perform operations upon video and/or audio clips. The operations performed by the processing module 46 of at least one embodiment can include, but are not limited to video filtering, video or visual effects, added graphics, added images, added photographs, cropping, resizing, etc. As just an example, the processing module 46 of at least one embodiment may change the colors, hues, brightness, contrast, etc. of the raw or recorded clip via one or more processing filters. In addition, the processing module 46 may utilize visual effects techniques and/or computer generated imagery (CGI) to manipulate or create environments or backgrounds, inanimate objects, animals or creatures that appear realistic, etc. Text, objects, images, photographs, shapes, etc. can be overlaid upon the clip or added to the background, foreground or other location.

Figure 5:
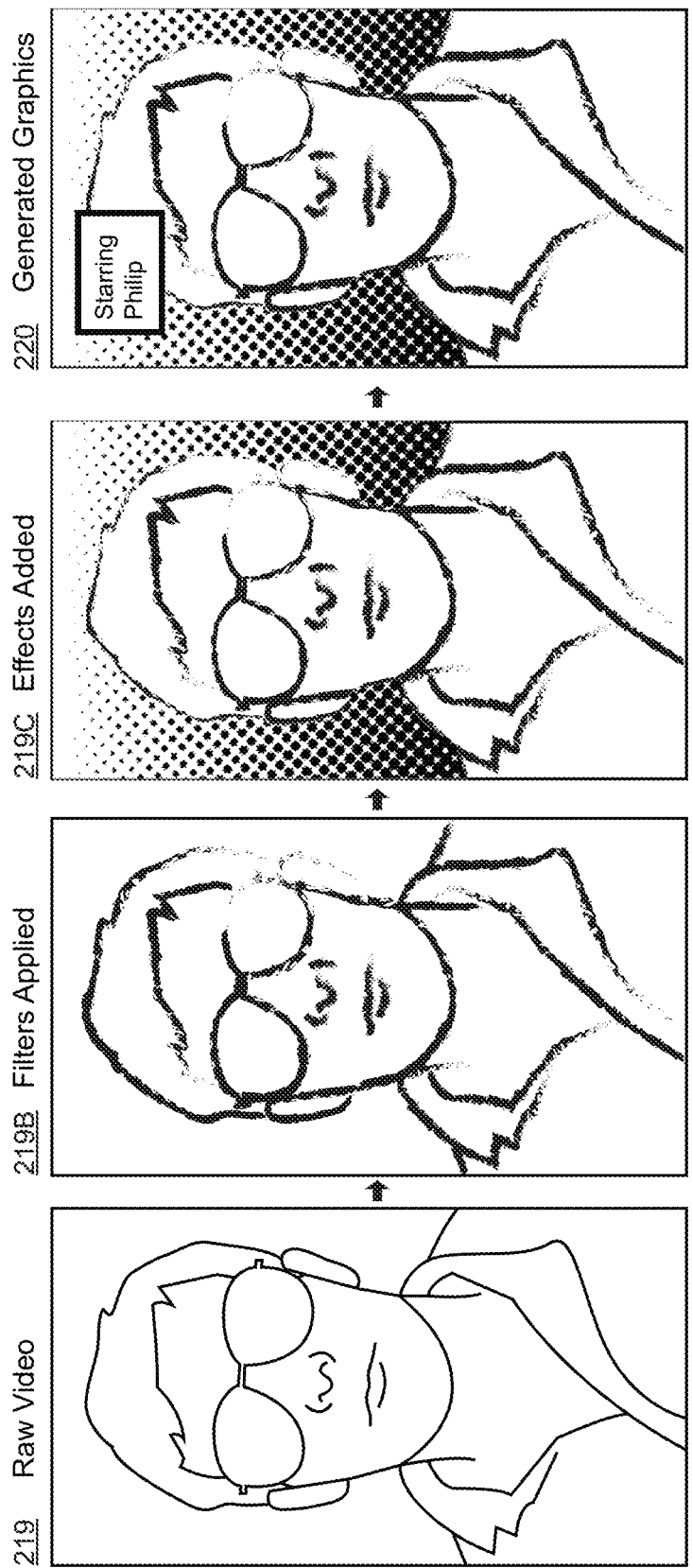
FIG. 5 is a series of exemplary screenshots illustrating a video being processed by the processing module of at least one embodiment of the present invention.

As just an example, FIG. 5 illustrates a sequence of operations that the processing module 46 can perform upon a raw or pre-processed media clip. In particular, 219 represents the raw or pre-processed media clip uploaded and provided by a user. In 219B, the processing module 46 has applied filters to the raw or pre-processed media clip, for example, by manipulating the colors, hues, brightness, contrast, etc. In 219C, visual or other effects are added to the file wherein the background is manipulated, in this example. In 220, generated graphic (e.g., an overlay with the text "Starring Phillip") is added to the clip in order to create the processed media clip. Of course, other processing can be accomplished by the processing module 46 of the various embodiments of the present invention and in accordance with the particular script associated with the clip.

It should also be noted that when the recorded media clips or are shared with one or more other users, for example, for approval or rejection, as mentioned above, in some embodiments, the processed media clip 220 is shared or otherwise made available for the other user(s), as shown at 118, whereas in other embodiments, the raw media clip is shared or otherwise made available for the other user(s).

Referring now to 123-126 in FIG. 3B, in at least one embodiment, the method 100 polls or loops until all clip requests are fulfilled for all of the character roles. In some cases, the method 100 will generate a prompt or notification, for example, in the form of a push notification, text or mobile message, email, etc., requesting the other users to fulfill any un-fulfilled clip requests. If one or more of the users are unable to fulfill any un-fulfilled clip requests (e.g., the user no longer participates with the group, the user has deleted the application, etc.), then in some embodiments, the method 100 will fulfill the clip request(s) with a pre-made or default finished clip that is stored on the management system 40. For example, the management system 40 of one embodiment includes pre-made or default finished clips that are able to fulfill any or some of the clip requests in accordance with the present invention. In the event one or more clip requests are unable to be fulfilled, or in the event a user or the management system determines one or more of the clips uploaded to the system as inappropriate, the system 10 or method 100 will automatically fill the corresponding clip requests with the pre-made or default clips.

In other embodiments, one or more of the users in the groups, e.g., any of the participating users including the initiating user, or in some cases only the initiating user, may seek additional users to join the group and fulfill any un-fulfilled clip requests.

With reference to 128 in FIG. 3B, in some cases, the processing module 46 of at least one embodiment may process the clips again based on final user data and input.

Once all of the clip requests are fulfilled, and all of the clips have been fully processed, an aggregation module 47 may be used to automatically combine all of the processed media clips 60-74, and all pre-made media 80-87 into a predefined sequence according to the script or script rules, as shown at 130 in FIG. 3B and in FIG. 6. Particularly, the aggregation module 47 of at least one embodiment includes a set of computer software instructions and/or hardware components that are able to identify the processed clips and arrange them with any pre-made clips, default clips or even dynamically-generated clips according to the corresponding script or script rules.

For instance, as shown in the example of FIG. 6, the script associated with the illustrated movie process requires a premade opening 80, four starring role clips 81-84, two pre-made interstitials 85-86 and generated credits 87. These additional clips 80-87 are interlaced with the processed media clips 60-74 in an order defined by the script to create the movie sequence. In some embodiments, some of the clips, for example, the generated credits 87 and/or the starring role clips 81-84 may be dynamically generated by the system 10 or method 100 to include information about the participating users, e.g., names, photographs, images, videos, etc.

Figure 7B:
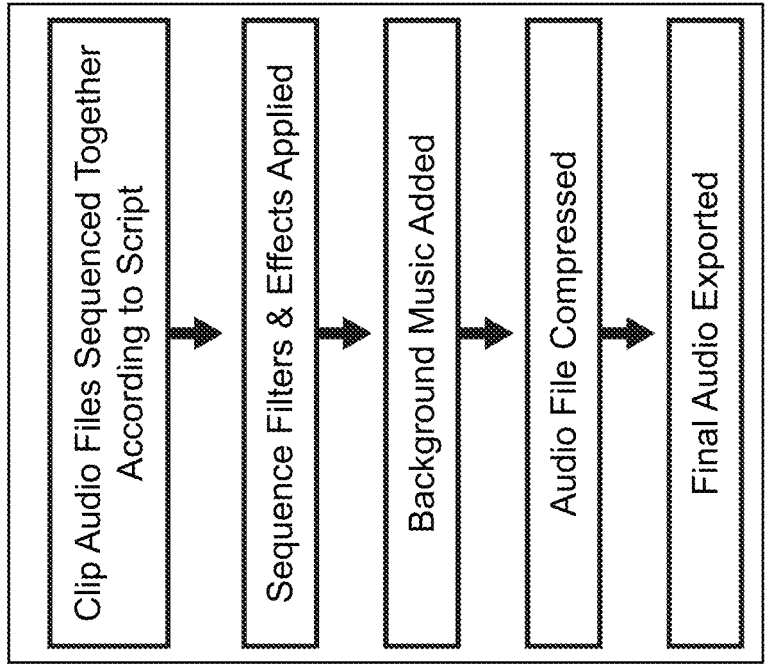
FIGS. 7A and 7B are flow diagrams illustrating audio processing of at least one embodiment of the present invention.
Figure 7A:
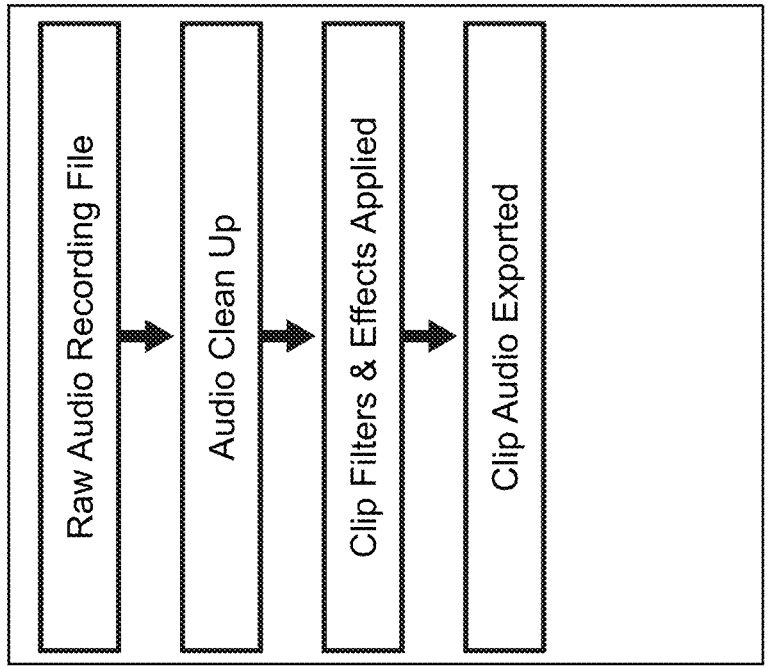

As shown at 132 in FIG. 3B, in some embodiments, after the movie sequence is created (e.g., as shown in FIG. 6), final filters and effects are applied to the video and/or the audio sequence, as also exemplified in FIGS. 7A and 7B. Finally, the movie sequence is rendered and, in some cases, compressed into a final movie, as shown at 134. Once the final movie is completed, it can be distributed to the participating users, for example, within the application 50 and/or communicated to other social networking websites or platforms.

Figure 8B:
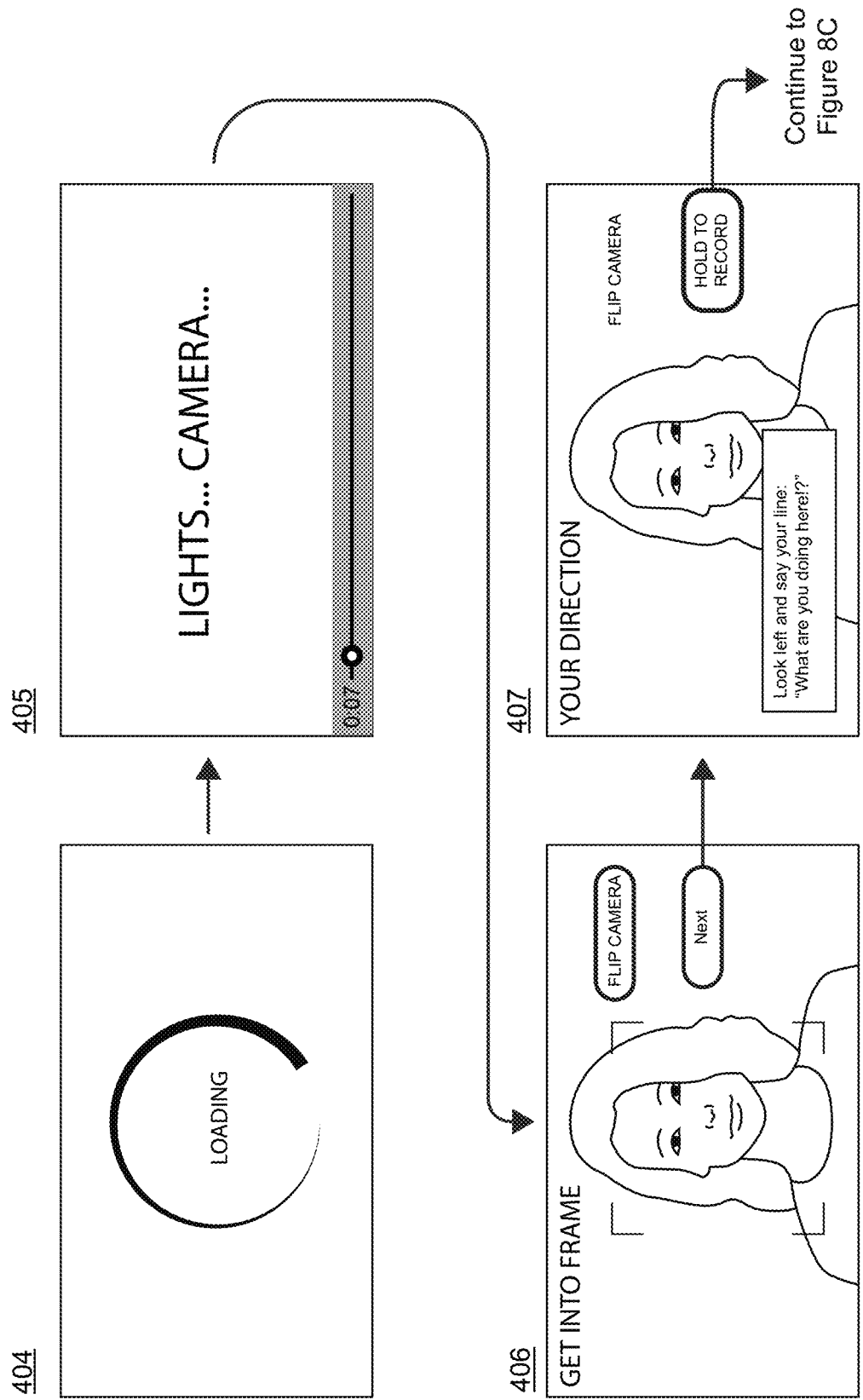
Figure 8C:
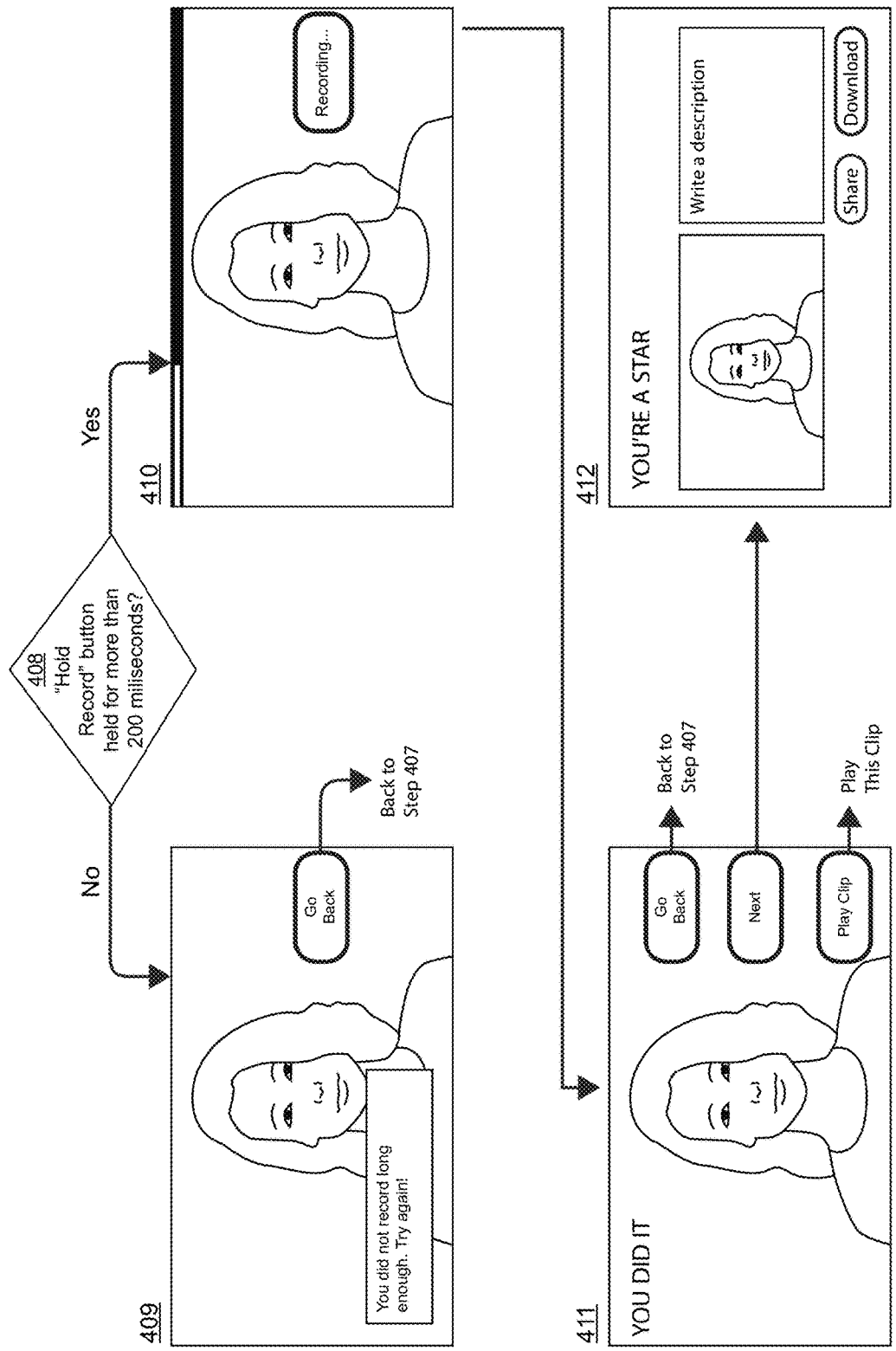

With reference now to FIGS. 8A-8C, a series of exemplary screenshots is shown wherein a user records a scene or clip request according to a script. In some embodiments, a single user can perform alongside pre-recorded actors/actresses or alongside other participating users who are unknown to the user. For example, in FIG. 8A, at 401, a user can choose a "show" and from within the selected show, at 403, the user can select a "scene." In FIG. 8B, at 404, the show-specific experience is loaded including a show-specific loading screen, and at 405 a short introduction video plays. At 406, the user is prompted to "get into frame" (e.g., via the performance instructions) to properly compose the shot. At 407, the performance instructions direct or instruct the user according to the corresponding script, which in this example is to "Look left and said your line: 'What are you doing here!?'" The user will press or hold the record button to begin recording. Referring now to FIG. 8C, in this example, the user must hold the record button for a predetermined amount of time (in this case, more than 200 milliseconds) to record enough video for the given clip request. At 409, since the record button was not pressed long enough, the application 50 prompted the user that she did not hold the record button long enough and to try again. In some cases, a timer bar or timer display is shown (e.g., via a bar at the top of the screen in 410) displaying how much time is remaining for the particular clip request.

As shown at 411, after the timer expires or when the user releases the recording button, the clip is ready to review. For instance, the clip has been recorded through the application and the user can play it back for review, try another take or move on to the next clip to record. As shown at 412, after all of the clips are recorded, or otherwise, after all of the clip requests have been fulfilled, the final movie is compiled and played. The user is then able to share the movie on other social media platforms, if desired.

Figure 9A:
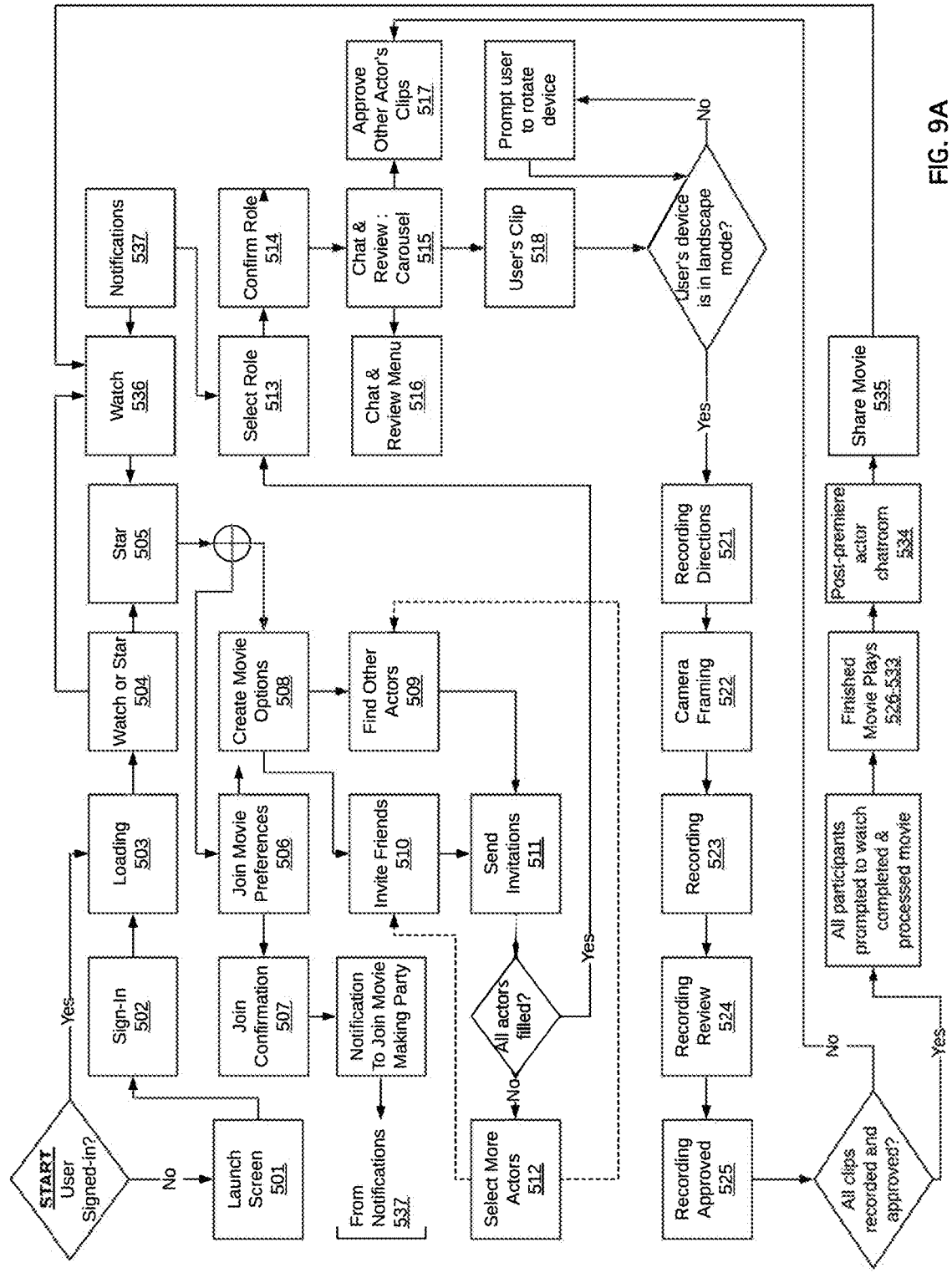
FIG. 9A is a flow diagram of the method as presented in accordance with at least one embodiment of the present invention.
Figure 9B:
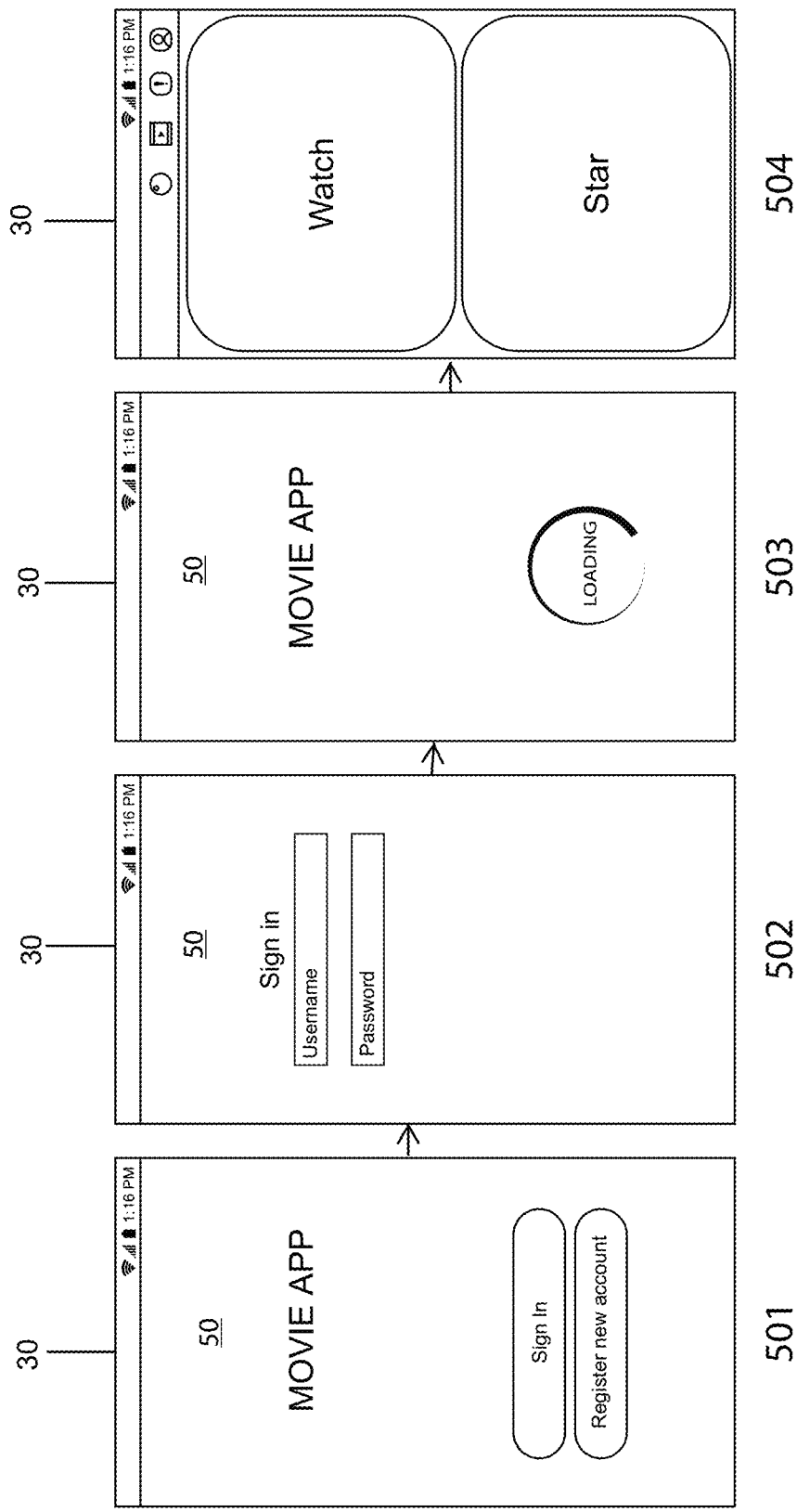
FIG. 9B illustrates a flow diagram of exemplary screenshots illustrating the initial log in procedure of at least one embodiment disclosed herein.

FIG. 9A represents a detailed flow diagram illustrating another method 500 as disclosed in accordance with at least one embodiment of the present invention. FIGS. 9B-9J3 represent exemplary screenshots on a user device 30 operating application 50—the screenshots correspond with the flow diagram of FIG. 9A. Specifically, the reference characters in FIG. 9A match with the reference characters shown in the screenshots of FIGS. 9B-9J3.

For example, as shown in FIGS. 9A and 9B, the application 50 or method 500 may begin with a launch screen 501, followed by a sign-in screen (where a user can input a username and password), followed by a loading screen 503 and then an option screen 504. In particular, at the option screen 504, a user can choose to either watch a movie or be a participant and star in a movie. If the user chooses to watch a movie, the application, system or method 500 of at least one embodiment will present one or more already-created movies that are available for the particular user to watch, for example, as shown at 536 in FIG. 9J1. Otherwise, if the user chooses to star in a movie and become a participant or participating user 20, in at least one embodiment, the system, method 500 or application 50 will allow the user to choose whether to join a group or create/initiate a new group, as shown at 505, FIG. 9C1. When joining a group, in some embodiments, the system, method 500 or application 50 will provide the user with one or more join-group options, as shown at 506 in FIG. 9C2. As an example, the join-group options may include, but are not limited to, an acting style, movie genre, movie script, etc. After selecting one or more of the join-group options, in some cases, the user is shown screen 507, FIG. 9C3, or similar, and the system, method 500 or application 50 will save the selected preferences in the user's account or profile to subsequently use when a group or another user is searching for a participating user to join their group. In that case, the preferences or selected join-group settings are user to match with the other group or user looking for a participant to join. In some embodiments all of the preferences or selected join-group options must match, while in other case, only some must match.

If the user chooses to create a new group or create a new movie, the system, method 500 or application 50 of one embodiment will provide the user with one or more movie-creation options, as shown at 508, FIG. 9C4. As an example, the movie-creation options can include, but are not limited to movie genre, movie script, acting style, etc.

It should be noted that in some embodiments, of the present invention, the system or method 500 incorporates or include social networking features or platforms along with the movie making process. For example, the users may like with other users or user accounts as "friends" or connections, and can communicate with one another via the system, method or application, for example, via private messages, comments on profiles, movies or posts, etc.

In any event, with reference to FIG. 9D2 and reference character 510, when creating a new group, the initiating user may invite his or her "friends" to join the croup and collectively create a movie. In this example, the system, method or application may identify (e.g., via a list, sorting, icon or indicia) "friends" who have "liked" or identified the user's selected movie-creation options (e.g., the selected movie genre) in his or her profile, settings or preferences. As shown in FIG. 9D1, 509, other users (not associated as "friends" or connections of the initiating user) can also be selected or invited to join. For example, as shown in FIG. 9D1, there is a list of "perfect matches," which show a list of users who have indicated a desire to join a group and who have selected join-group options that match the selected movie-creation options. Other list can include partial matches, such as acting and genre matches, for example.

As shown in FIG. 9D3, 511 the user can select users, for example, by highlighting an avatar or name, and selecting to send an invitation to those users. If the system, method or application determines that the user has not selected enough users to fill every character role in the selected script, then the system, method or application will prompt the user, as shown in FIG. 9D4, 512. In one example, the system, method or application can prompt the user to go back, choose strangers, or have the system, method or application randomly chose a user.

With reference to FIG. 9J2 and 537, an exemplary notification is illustrated that is sent to a user who has been selected to join a group. Specifically, the system, method or application will generate a notification for those users who have been selected by the initiating user or randomly by the system, method or application to join a group, and therefore, to participate in the collaborative creation of a movie. These notifications can appear the in application and/or they can be sent via push notifications, text or mobile messaging, email, etc.

In the example shown, the title of the movie selected is "I Married a Robot," as shown in screenshot 513 in FIG. 9E1. In this screen, the system, method or application allows the selected user(s) to choose a role, as described above in accordance with at least one embodiment. In particular, the system, method or application will assign the user(s) in the group to role(s) according to the script—in this case, the script for the movie "I Married a Robot." In FIGS. 9E1 and 9E2, screenshots 513 and 514, the user may choose and confirm a role, in this case, Role 2, which has not been claimed by other users of the group.

While waiting for other users to join the group and select/confirm or be assigned to a role, the system, method or application of at least one embodiment may present the user(s) with a chat and review carousel, as shown for example in FIG. 9E3, screenshot 515. A menu, as shown in FIG. 9E4, screenshot 517, may also be included allowing users to view information about the group (e.g., the other participants—castmates, roles, etc.) FIG. 9F2, screenshot 518, illustrates an exemplary view where a user can see a list of clips or clip requests that the user needs to fulfill according to the corresponding script. In the example shown, the user has not recorded or captured any clips, yet. In one embodiment, the system, method or application will identify the orientation of the user device 30 (e.g., whether it is being held in landscape or portrait mode) and indicate that the user should rotate the device if the device is in a portrait mode orientation or is in an orientation that does not match the script. In at least one embodiment, for example, as shown in FIGS. 9E3 (screenshot 515) and 9F2 (screenshot 518), the clip request(s) for all of the participating users of a common group are presented in a carousel or gallery style display, and may be presented in the order in which the clips will eventually be compiled to create the final movie. As an example, if there are a total of eight clip requests for the entire group according to the corresponding script, there may be eight displays (1 of 8, 2 of 8, . . . 8 of 8) presented in a carousel or gallery style (or other display). A user may navigate between the different clip requests, for example, by swiping left or right, or by clicking on left or right arrows, or other manner. When a user navigates through the display to a clip request that is assigned to his/her user account, the user will be prompted to record a clip in order to fulfill the clip request. If the user navigates away from the display or closes the application 50, the system, method or application may send a notification or reminder to return and finish recording. Also, in some cases, if the user is the last person to fulfill his or her clip requests, then in some cases, the system, method or application will send a notification or reminder to begin or finish recording.

In this manner, the system, method and application illustrated in FIGS. 9A through 9J3 allow the users to asynchronously fulfill clip requests and asynchronously record and upload raw (or pre-processed) video clips. As an example, shown in FIG. 9F3, screenshot 519, the system, method or application is currently displaying clip request 6 of 8 to the user (username @accountname1), and indicating that the next displayed clip request (clip request 7 of 8) is assigned to @accountname2. Thus, if the user were to swipe the screen or click a next arrow to navigate to the next clip request, the display will show the next clip request, as illustrated in FIG. 9F4. Specifically, in FIG. 9F4, the system, method or application is currently displaying clip request 7 of 8 and indicating that the next displayed clip request (clip request 8 of 8) is assigned to the viewing user (@accountname1).

It should be noted that the carousel or gallery style display where users are able to swipe the display screen or click next to view additional clip requests is exemplary in nature. Other embodiments may display the clip requests in a list, and in some embodiments, only the clip requests associated with the viewing user or the character role assigned to the viewing user are shown.

FIGS. 9G1 (screenshot 521), 9G2 (screenshot 522), 9G3 (screenshot 523), FIGS. 9G4 (screenshot 524) and 9G5 (screenshot 525) illustrate the system, method 500 and application capturing a media clip, such as a raw or pre-processed media clip, in accordance with at least one embodiment. It should be noted that raw or pre-processed media clip, as used herein, refers to a media clip or a multimedia clip, such as a video and/or audio file recoded via the user device and not yet automatically processed by the management system 40. The raw or pre-processed media clip can have some processing applied to it, for example, by the user or the user device and still be considered a raw or pre-processed media clip in accordance with the present invention so long as it has not been processed by the management system 40 in accordance with the script, as described herein. For example, in FIG. 9G1, the system, method or application is displaying performance or clip instructions to the user via the user device. In this example, the performance or clip instructions include "Your direction: Relieved and Exhausted. Your Line: 'It's over now, kid, we really did it.'" In FIG. 9G2, the user will place herself within the guided frame displayed on the screen, and in FIG. 9G3, the user is recording herself saying her line buy holding or pressing the record button. In FIG. 9G4 the user is able to review the clip (e.g., by playing it back), retry the clip (e.g., by re-recording the clip), or approve the clip. In FIG. 9G5, the clip has been approved by the user.

With reference to FIG. 9F1, in at least one embodiment, each user can or in some cases must approve the clips created by the other participating users in the group. For example, the user can swipe or scroll through the clips created by the other users and can approve or reject the clips. At this stage, the users are also able to chat with one another for example, as shown in the screenshot 517.

When all of the clips are approved by the participants in the group, or otherwise when all of the clips are finalized, the system or method will process the clips, aggregate the clips into a single movie, along with other pre-made content and/or dynamically generated content, as disclosed in accordance with another embodiment herein, and the final movie is created.

FIGS. 9H1-9H8, screenshots 526-533, illustrate the final movie being distributed to the users to play on their user devices.

In one embodiment, a final chat room is provided, FIG. 911, screenshot 534, where the participants can communicate with one another. In FIG. 912, screenshot 535, the users are able to share the final movie on other social media platforms, if desired.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described.

What is claimed is:

1. A method for collaboratively creating an automatically assembled movie, the method comprising:
    using at least one processor, identifying a predefined movie script, wherein the predefined movie script defines a plurality of character roles and, for each of the plurality of character roles, the predefined movie script defines at least one clip request, the at least one clip request comprising at least one performance instruction to direct a performer fulfilling the at least one clip request,
    using the at least one processor, assigning each of the plurality of character roles to one of a plurality of user accounts to define a group of assigned user accounts,
    for each of the character roles defined by the predefined movie script:
        communicating the at least one performance instruction defined by the predefined movie script and corresponding to the at least one clip request to a user device, the at least one performance instruction being displayed on a screen of the user device,
        capturing a pre-processed media clip corresponding to the at least one clip request and the at least one performance instruction as defined by the predefined movie script,
    using the at least one processor, individually and automatically processing a plurality of pre-processed media clips based upon processing rules associated with the predefined movie script to create a plurality of processed media clips, and
    using the at least one processor, automatically aggregating the plurality of processed media clips into a predefined order according to aggregation rules of the predefined movie script to create a final movie.

2. The method as recited in claim 1 wherein identifying a predefined movie script comprises an initiating user selecting an identification of the predefined movie script from a collection of a plurality of movie script identifiers.

3. The method as recited in claim 2 further comprising sending an invitation notification to a plurality of user accounts to participate in collaboratively creating the final movie, and assigning each of the plurality of user accounts to a character role.

4. The method as recited in claim 1 wherein the plurality of pre-processed media clips are asynchronously captured via a plurality of different user devices and asynchronously uploaded to a movie management system.

5. The method as recited in claim 1 wherein the performance instruction comprises an instruction for a user to verbally recite at least one dialogue line during the capturing of the corresponding one of the plurality of pre-processed media clips.

6. The method as recited in claim 5 wherein the performance instruction comprises a positioning instruction directing the user how to be positioned during the capturing of the corresponding one of the plurality of raw media clips.

7. The method as recited in claim 1 wherein individually processing each of the plurality of pre-processed media clips to create the plurality of processed media clips comprises adding at least one of the following to the plurality of pre-processed media clips based upon the processing rule of the predefined movie script: a video filter, an image filter, a graphic, an overlay, an effect, audio, and text.

8. The method as recited in claim 7 further comprising, prior to aggregating the plurality of processed media clips, and as the processed media clips are created, distributing the processed media clips to the plurality of user accounts within the assigned group of user accounts, wherein the processed media clips can be approved or rejected by the plurality of user accounts within the assigned group of user accounts.

9. A method for collaboratively creating an automatically assembled movie, the method comprising:
    using at least one processor, identifying a movie script, wherein the movie script defines a plurality of character roles and, for each of the plurality of character roles, the movie script defines at least one clip request, the at least one clip request comprising at least one performance instruction to direct a performer fulfilling the at least one clip request,
    using the at least one processor, inviting a plurality of users to join a movie making group, and assigning each of the plurality of users of the movie making group to at least one of the plurality of character roles defined by the identified movie script,
    for each of the character roles defined by the identified movie script:
        asynchronously receiving, from a user device, at least one media clip corresponding to the at least one clip request as defined by the identified movie script, wherein the at least one media clip is captured via the user device and wherein the at least one performance instruction corresponding to the at least one clip request is communicated to the user device and displayed on a screen of the user device,
        processing the at least one media clip based upon the identified movie script to create a processed media clip, and distributing the at least one processed media clip to the participating users for approval, once all of the processed media clips are created, aggregating all of the processed media clips into a predefined order according to the identified movie script to create a final movie, and distributing the final movie to the participating users.

10. The method as recited in claim 9 wherein the at least one performance instruction comprises an on-screen instruction for a user to verbally recite at least one line during the asynchronously capturing of the at least one media clip.

11. The method as recited in claim 10 wherein the at least one performance instruction comprises an on-screen positioning instruction directing the user how to be positioned during the asynchronously capturing of the at least one media clip.

12. The method as recited in claim 9 wherein processing the at least one media clip comprises adding at least one of the following to the at least one media clip based upon the identified movie script: a video filter, an image filter, a graphic, an overlay, an effect, audio, and text.

13. A system for collaboratively creating an automatically assembled movie, the system comprising:

a movie management system comprising at least one computer processor and at least one computer-readable medium having instructions stored thereon which, when executed by the at least one computer processor of the movie management system cause the movie management system to perform the following operations:

identifying a movie script, wherein the movie script defines a plurality of character roles and, for each of the plurality of character roles, the movie script defines at least one clip request, the at least one clip request comprising at least one performance instruction to direct a performer fulfilling the at least one clip request, inviting a plurality of users to join a movie making group, and assigning each of the plurality of users of the movie making group to at least one of the plurality of character roles, for each of the character roles defined by the identified movie script:

asynchronously receiving, from a user device, at least one media clip corresponding to the at least one clip request, wherein the at least one media clip is captured via the user device and wherein the at least one performance instruction corresponding to the at least one clip request is communicated to the user device and displayed on a screen of the user device, processing the at least one media clip based upon the identified movie script to create a processed media clip, and once all of the processed media clips are created, aggregating all of the processed media clips into a predefined order according to the identified movie script to create a final movie, and distributing the final movie to the users of the movie making group.

14. The system as recited in claim 13 wherein the at least one performance instruction comprises an instruction for a user to verbally recite at least one line during the asynchronously capturing of the at least one raw media clip.

15. The system as recited in claim 13 wherein the at least one performance instruction comprises a positioning instruction directing the user how to be positioned during the asynchronously capturing of the at least one raw media clip.

16. The system as recited in claim 13 wherein processing the at least one media clip comprises adding at least one of the following to the at least one media clip based upon the predefined movie script: a video filter, an image filter, a graphic, an overlay, an effect, audio, and text.

\* \* \* \* \*